United States Patent
Smith et al.

(10) Patent No.: US 11,673,664 B2
(45) Date of Patent: Jun. 13, 2023

(54) ANCHORED AERIAL COUNTERMEASURES FOR RAPID DEPLOYMENT AND NEUTRALIZING OF TARGET AERIAL VEHICLES

(71) Applicant: Sarcos Corp., Salt Lake City, UT (US)

(72) Inventors: Fraser M. Smith, Salt Lake City, UT (US); Marc X. Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 114 days.

(21) Appl. No.: 17/175,418

(22) Filed: Feb. 12, 2021

(65) Prior Publication Data

US 2021/0188435 A1 Jun. 24, 2021

Related U.S. Application Data

(62) Division of application No. 16/151,289, filed on Oct. 3, 2018, now Pat. No. 11,192,646.

(51) Int. Cl.
*B64C 39/02* (2023.01)
*B64D 47/08* (2006.01)
(Continued)

(52) U.S. Cl.
CPC ............ *B64C 39/024* (2013.01); *B64D 47/08* (2013.01); *B64F 1/02* (2013.01); *G05D 1/0094* (2013.01);
(Continued)

(58) Field of Classification Search
CPC ............ B64C 39/024; B64C 2201/042; B64C 2201/12; B64C 2201/182;
(Continued)

(56) References Cited

U.S. PATENT DOCUMENTS 4,240,601 A 12/1980 Reed
6,119,976 A 9/2000 Rogers
(Continued)

FOREIGN PATENT DOCUMENTS

CN 107792381 A 3/2018
DE 102015003323 A1 9/2016
(Continued)

OTHER PUBLICATIONS

Airspace Systems Inc.; "Airspace LV"; Vimeo [online] [video]; vimeo.com; (Apr. 5, 2017); 2 pages; [retrieved on Oct. 2, 2018]; Retrieved from <URL: https://vimeo.com/211704482?from=outro-embed >.

(Continued)

*Primary Examiner* — Muhammad Shafi

(57) ABSTRACT

A system for neutralization of a target aerial vehicle comprises a plurality of counter-attack unmanned aerial vehicles (UAVs) and an aerial vehicle detection system comprising at least one detection sensor operable to detect the target aerial vehicle in flight. The system also comprises an aerial vehicle capture countermeasure in the form of a net tethering the plurality of counter-attack UAVs to one another. The counter-attack UAV(s) are operable to capture and neutralize the target aerial vehicle with the net. The system can comprise at least one net storage device associated with a structure and configured to store at least a portion of the net when in a stowed position, and to facilitate deployment of the net when moved to a deployed position via coordinated flight of the plurality of counter-attack UAVs based on the detected target aerial vehicle.

28 Claims, 10 Drawing Sheets

(51) Int. Cl.
*B64F 1/02* (2006.01)
*G05D 1/00* (2006.01)

(52) U.S. Cl.
CPC .... *B64C 2201/042* (2013.01); *B64C 2201/12* (2013.01); *B64C 2201/182* (2013.01)

(58) Field of Classification Search
CPC ........ B64C 2201/121; B64C 2201/148; B64D 47/08; B64F 1/02; G05D 1/0094
USPC ........................................................ 701/3
See application file for complete search history.

(56) References Cited

U.S. PATENT DOCUMENTS

| | | | |
|---|---|---|---|
| 6,392,213 | B1 | 5/2002 | Martorana et al. |
| 8,146,855 | B2 | 4/2012 | Ismailov |
| 9,085,362 | B1 | 7/2015 | Kilian et al. |
| 9,789,950 | B1 | 10/2017 | Most et al. |
| 10,040,554 | B1 | 8/2018 | Weinstein et al. |
| 10,364,026 | B1* | 7/2019 | Hanlon .................. B64F 3/02 |
| 10,384,772 | B2* | 8/2019 | Yamada ................. B64C 25/36 |
| 10,663,266 | B2 | 5/2020 | Banga et al. |
| 10,689,109 | B2 | 6/2020 | Wypyszynski et al. |
| 10,926,875 | B2 | 2/2021 | Klein |
| 2009/0114761 | A1 | 5/2009 | Sells, II |
| 2009/0212157 | A1 | 8/2009 | Ariton et al. |
| 2010/0181424 | A1 | 7/2010 | Goossen et al. |
| 2012/0216697 | A1 | 8/2012 | Jacobsen et al. |
| 2012/0252485 | A1 | 10/2012 | Wolverton et al. |
| 2014/0183300 | A1 | 7/2014 | MacCulloch et al. |
| 2015/0360797 | A1 | 12/2015 | Melish et al. |
| 2016/0023760 | A1 | 1/2016 | Goodrich |
| 2016/0117932 | A1 | 4/2016 | Park et al. |
| 2016/0250535 | A1 | 9/2016 | Yatsko |
| 2016/0251088 | A1 | 9/2016 | Melish et al. |
| 2016/0293015 | A1 | 10/2016 | Bragin |
| 2016/0376029 | A1 | 12/2016 | Sekiya |
| 2017/0057635 | A1 | 3/2017 | Strayer |
| 2017/0059692 | A1* | 3/2017 | Laufer ................. F41G 7/2253 |
| 2017/0144756 | A1 | 5/2017 | Rastgaar Aagaah et al. |
| 2017/0205820 | A1 | 7/2017 | Liu |
| 2017/0225784 | A1* | 8/2017 | Hayes ................. B64C 29/0025 |
| 2017/0253348 | A1 | 9/2017 | Ashdown et al. |
| 2017/0261292 | A1 | 9/2017 | Armstrong et al. |
| 2017/0261604 | A1* | 9/2017 | Van Voorst ............. G01S 7/495 |
| 2017/0291704 | A1 | 10/2017 | Alegria |
| 2017/0355461 | A1 | 12/2017 | Naito et al. |
| 2017/0356726 | A1 | 12/2017 | Theiss et al. |
| 2017/0369169 | A1 | 12/2017 | Lee et al. |
| 2018/0162528 | A1 | 6/2018 | McGrew et al. |
| 2018/0162529 | A1 | 6/2018 | Klein |
| 2018/0162530 | A1 | 6/2018 | Klein |
| 2018/0164080 | A1 | 6/2018 | Chi-Hsueh |
| 2018/0197420 | A1 | 7/2018 | Banga |
| 2018/0224262 | A1 | 8/2018 | Klein |
| 2018/0237161 | A1 | 8/2018 | Minnick et al. |
| 2018/0244401 | A1 | 8/2018 | Kilian et al. |
| 2018/0257780 | A1 | 9/2018 | Sassinsky |
| 2018/0335779 | A1 | 11/2018 | Fisher et al. |
| 2019/0025858 | A1 | 1/2019 | Bar-Nahum et al. |
| 2019/0063881 | A1* | 2/2019 | Abramov ................ F41H 11/02 |
| 2019/0068953 | A1 | 2/2019 | Choi et al. |
| 2019/0100315 | A1 | 4/2019 | Theiss |
| 2019/0112045 | A1 | 4/2019 | Zhang |
| 2019/0129427 | A1 | 5/2019 | Sugaki et al. |
| 2019/0176684 | A1 | 6/2019 | Zych |
| 2019/0176986 | A1 | 6/2019 | Addonisio et al. |
| 2019/0346241 | A1 | 11/2019 | Metz et al. |
| 2020/0108922 | A1 | 4/2020 | Smith et al. |
| 2020/0108923 | A1* | 4/2020 | Smith .................... B64D 47/08 |
| 2020/0108924 | A1 | 4/2020 | Smith et al. |
| 2020/0108925 | A1 | 4/2020 | Smith et al. |
| 2020/0108926 | A1 | 4/2020 | Smith et al. |

FOREIGN PATENT DOCUMENTS

| | | |
|---|---|---|
| FR | 2965908 A1 | 4/2012 |
| JP | 2007-223491 A | 9/2007 |
| JP | 2019-060589 A | 4/2019 |
| KR | 10-2015-0145786 | 12/2015 |
| KR | 10-2016-0071027 A | 6/2016 |
| KR | 10-2017-0079782 | 7/2017 |
| KR | 10-1830880 B1 | 2/2018 |
| KR | 10-2020-0042307 A | 4/2020 |
| WO | WO 2016/193722 A1 | 12/2016 |
| WO | WO 2018/016017 A1 | 1/2018 |
| WO | WO 2018/112281 A1 | 6/2018 |

OTHER PUBLICATIONS

Airspace Systems, Inc.; "Airspace"; airspace.co; (2016); 4 pages; [retrieved on Oct. 2, 2018]; Retrieved from <URL: http://airspace.co/#technolgy >.
Atherton; "This Drone Fires Nets to Catch Other Drones"; Popular Science; (Apr. 5, 2016); [retrieved on Oct. 2, 2018]; Retrieved from <URL: https://www.popsci.com/drone-fires-nets-to-catch-other-drones >.
Dedrone; "Dedrone Videos"; dedrone.com; (2018); 3 pages; [retrieved on Oct. 2, 2018]; Retrieved from <URL: https://www.dedrone.com/products/videos>.
Fortem Technologies; "Fortem DroneHunter™ Demonstration"; YouTube [online] [video]; YouTube.com; (Sep. 24, 2017); 1 page; [retrieved on Oct. 2, 2018]; Retrieved from <URL: https://www.youtube.com/embed/BsFXLPFzK-4 >.
Groupe Assmann; "Drone Interception"; YouTube [online] [video]; YouTube.com; (Dec. 12, 2014); 2 pages; [retrieved on Oct. 2, 2018]; Retrieved from <URL: https://youtu.be/APWG3VEGbJw >.
Moseman; "This Drone Interceptor Captures Your Pathetic Puny Drone With a Net"; Popular Mechanics; (Feb. 11, 2015); 6 pages; [retrieved on Oct. 2, 2018]; Retrieved from <URL: http://www.popularmechanics.com/flight/drones/a14032/france-dispatches-a-net-carrying-bully-drone-to-catch/ >.
Openworks Engineering Ltd.; "SkyWall"; Openworks Engineering; [brochure]; (2017); 15 pages; <URL: https://openworksengineering.com/skywall >.
Starrs; "To Catch a Drone, Use a Net"; The Washington Post (WP Company LLC); (Jan. 15, 2016); 3 pages; [retrieved on Oct. 2, 2018]; Retrieved from <URL: https://www.washingtonpost.com/news/morning-mix/wp/2016/01/15/watch-a-drone-catcher-net-a-rogue-drone/?utm_term=.63257596ca17 >.
International Search Report for International Application No. PCT/US2019/054537 dated Jul. 16, 2020, 22 pages.
International Search Report for International Application No. PCT/US2019/054545 dated Jul. 24, 2020, 24 pages.
International Search Report for International Application No. PCT/US2019/054547 dated Jul. 24, 2020, 23 pages.
International Search Report for International Application No. PCT/US2019/054552 dated Jan. 13, 2020, 20 pages.
International Search Report for International Application No. PCT/US2019/054541 dated Jan. 14, 2020, 18 pages.

* cited by examiner

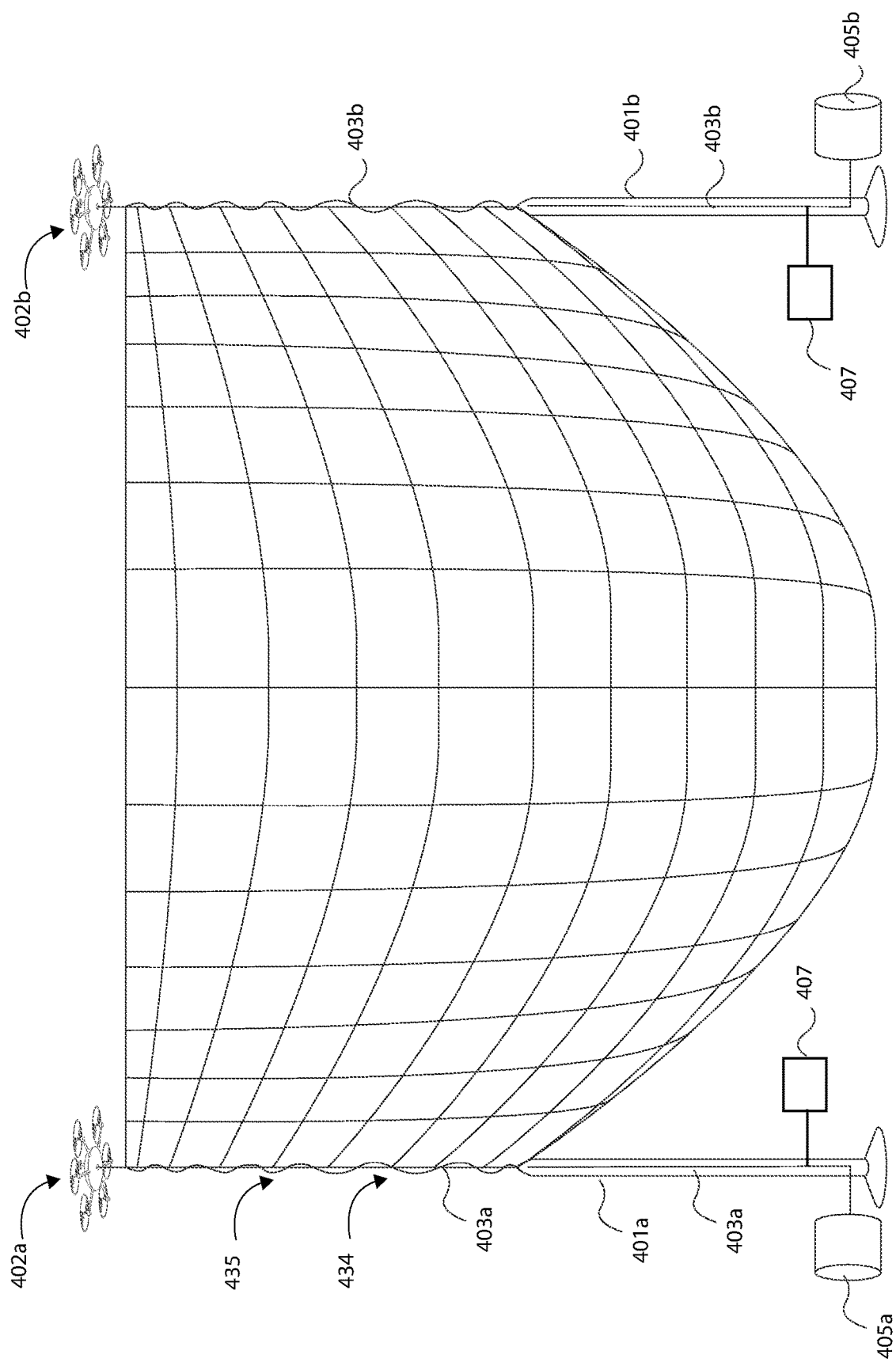

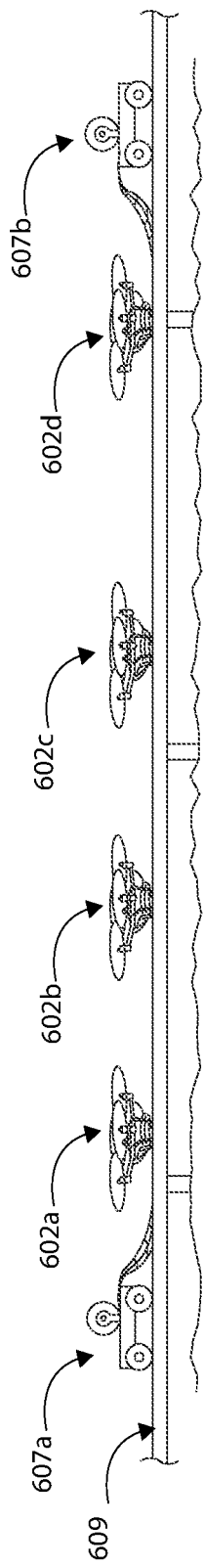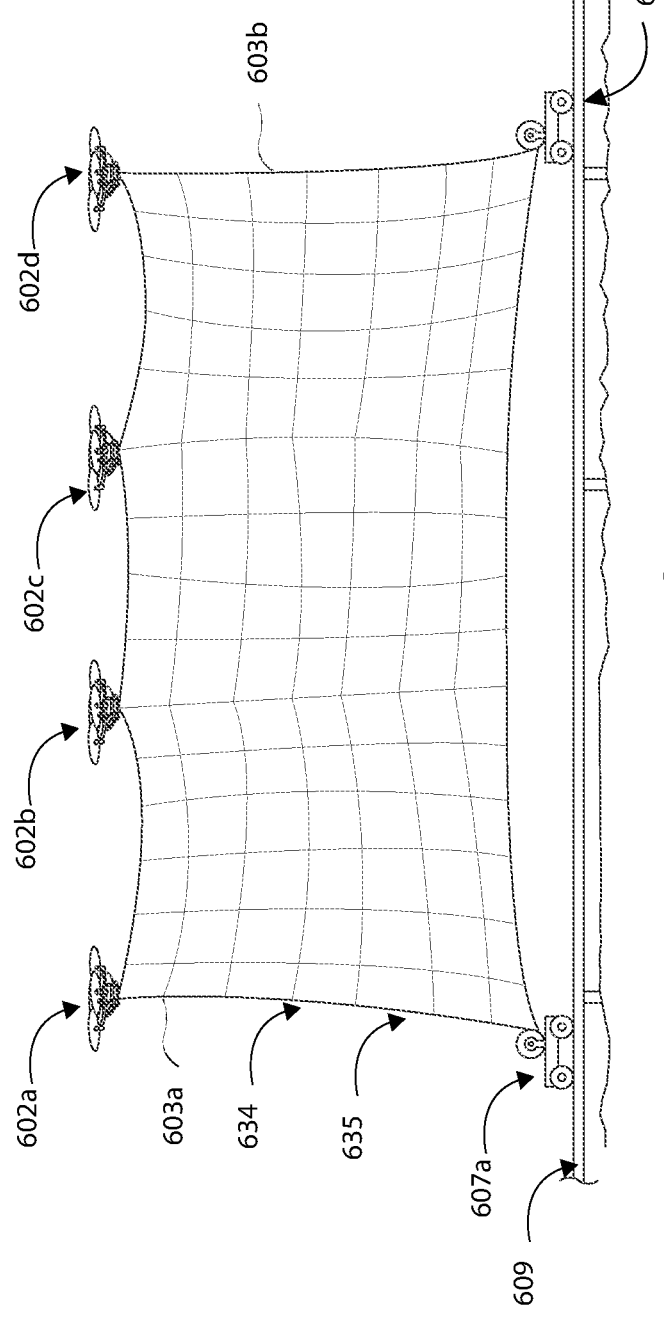

ANCHORED AERIAL COUNTERMEASURES FOR RAPID DEPLOYMENT AND NEUTRALIZING OF TARGET AERIAL VEHICLES

RELATED APPLICATIONS

This application is a divisional application of U.S. patent application Ser. No. 16/151,289, filed Oct. 3, 2018, and entitled, "Anchored Aerial Countermeasures for Rapid Deployment and Neutralizing Of Target Aerial Vehicles," which is incorporated by reference herein in its entirety.

BACKGROUND

Unmanned aerial vehicles (UAVs), such as multi-rotor drones, fixed-wing drones, and tilt rotor drones, have become increasingly popular in the past decade. This popularity, coupled with their constantly improving performance capabilities, pose threats in terms of collisions with other aerial vehicles or structures, whether accidental or deliberate. More serious threats are also becoming more of a realization and possibility, such as terrorist attacks on high-value targets, such as government complexes, international airports, nuclear or other power plants, petrochemical facilities, water reservoirs, sporting events, and other highly-populated or critical infrastructure or locations. Factors that contribute to such threats are the high rate of speed of drones, their small signature, the possibility of simultaneous, coordinated attacks from a number of attacking drones, their ability to carry increasingly large payloads, and others. These factors are exacerbated by the fact that drones are relatively inexpensive, easy to acquire, highly portable, and highly maneuverable. Moreover, consumer drones are dramatically improving in terms of endurance, range, and payload transport capabilities (e.g., some consumer drones can carry up to 50 lbs., with other more expensive and advanced drones being able to carry up to 400 pounds), which is enough to carry significant amounts of explosives, projectiles, biological, and/or chemical weapons). In many cases, a drone operated for a deliberate attack can be launched and flown into a protected perimeter within just a few seconds, which leaves minimal time to detect and neutralize the attacking drone.

With all these considerations in mind, one or more inexpensive adversarial drones can be autonomously or manually flown into a protected area while potentially causing a large amount of damage and/or harm, all at a very low cost and effort by a programmer/operator. Counteracting such threats with existing technologies can be very costly and complex, particularly when trying to protect a relatively large airspace associated with hundreds of acres or square kilometers of a property.

SUMMARY OF THE INVENTION

The present disclosure sets forth a system for neutralization of a target aerial vehicle comprising one or more counter-attack unmanned aerial vehicles (UAVs), and an aerial vehicle detection system comprising at least one detection sensor operable to detect a target aerial vehicle in flight, and operable to provide command data, which can include location data, associated with the detected target aerial vehicle to the one or more counter-attack UAVs. The system comprises an aerial vehicle capture countermeasure tethered between the one or more counter-attack UAVs and a structure, such as a ground-based structure. In response to receiving the command data, the one or more counter-attack UAVs are operable to deploy to move the aerial vehicle capture countermeasure from a stowed position to a deployed position to capture the target aerial vehicle, thereby neutralizing the target aerial vehicle.

In one example, the each of the one or more counter-attack UAVs comprises a flight body and a flight control system that controls flight of the counter-attack UAV.

In one example, each of the one or more counter-attack UAVs comprises at least one on-board sensor configured to detect a position of the target aerial vehicle, and the flight control system can comprise a flight controller operable to control autonomous flight of the counter-attack UAV based on the detected position of the target aerial vehicle.

In one example, the at least one on-board sensor comprises a camera movably coupled to the flight body and operable to modify a pointing position of the camera according to the detected position of the target aerial vehicle.

In one example, the aerial vehicle detection system comprises an external aerial vehicle detection system associated with a ground-based structure to monitor an airspace, and the at least one detection sensor comprises a plurality of detection sensors configured to detect a plurality of target aerial vehicles.

In one example, further comprising a plurality of counter-attack UAVs tethered to the structure by the aerial vehicle capture countermeasure. Each counter-attack UAV comprises a communication device communicatively coupled to other communication devices of the other counter-attack UAVs to communicate respective positions of the plurality of counter-attack UAVs, thereby facilitating coordinated flight of the plurality of counter-attack UAVs.

In one example, the aerial vehicle capture countermeasure comprises at least one flexible entangling element configured to disrupt operation of at least one rotary propeller device of the target aerial vehicle.

In one example, the at least one flexible entangling element comprises at least one of a net, filament, monofilament, braided filament, tendril, fiber, string, cord, strand, thread, rope, or wire.

In one example, each of the one or more counter-attack UAVs is electrically coupled to an external power source associated with the structure for powering the counter-attack UAV(s).

In one example, the aerial vehicle capture countermeasure comprises a net.

In one example, the net is configured to be moveable from a stowed position to a deployed position in response to flight of the one or more counter-attack UAVs.

In one example, the system can comprise at least one storage device associated with the structure and configured to store at least a portion of the net when in the stowed position, and configured to facilitate deployment of the net when moved to the deployed position.

In one example, the system comprises at least one drum reel device associated with the structure, and the at least one drum reel device can be coupled to the net by a retractable tether and operable to facilitate deployment of the net via the retractable tether when moved to the deployed position.

In one example, the system further comprises a plurality of counter-attack UAVs tethered to the structure by the net. The plurality of counter-attack UAVs can be operable in a coordinated manner to move the net, after being moved to the deployed position, to a capture position based on the position of the detected target aerial vehicle.

In one examples, the system further comprises at least one dynamic net support mechanism associated with the structure and coupled to the net, and the at least one dynamic net support mechanism can be operable to move in a first direction relative to the structure, such that the net and the counter-attack UAVs move with the at least one movable net support mechanism.

In one example, the system further comprises a rail system associated with the structure, and the at least one dynamic net support mechanism can comprise at least two net support mechanism movable in a coordinated manner along the rail system.

In one example, the plurality of counter-attack UAVs are operable in coordinated manner to move the net in a second direction different from the first direction.

In one example, the plurality of counter-attack UAVs are operable in a coordinated manner to support the net in the deployed position to define a perimeter net area.

In one example, the system further comprises at least one external power source electrically coupled to each of the counter-attack UAVs to facilitate extended flight time and to maintain the perimeter net area.

In one example, the command data comprises at least one of aerial vehicle capture countermeasure deployment command data, target aerial vehicle detection data, counter-attack UAV control data, or a combination thereof.

The present disclosure sets forth a system for neutralization of a target aerial vehicle comprising: a plurality of counter-attack unmanned aerial vehicles (UAVs); an aerial vehicle detection system comprising at least one detection sensor operable to detect a target aerial vehicle in flight; a net tethering the plurality of counter-attack UAVs to each other; and at least one net storage device associated with the structure and configured to store at least a portion of the net when in a stowed position, and to facilitate deployment of the net when moved to a deployed position in response coordinated flight of the plurality of counter-attack UAVs based on the detected target aerial vehicle.

In one example, the present disclosure sets forth a method for neutralization of a target aerial vehicle. The method comprises: detecting a target aerial vehicle in flight; operating one or more counter-attack UAVs to maintain an aerial vehicle capture countermeasure in a deployed position (the aerial vehicle capture countermeasure tethering the one or more counter-attack UAVs to a structure, or in other words the one or more counter-attack UAVs being tethered to a structure via the aerial vehicle capture countermeasure); and capturing the target aerial vehicle with the aerial vehicle capture countermeasure, thereby neutralizing the target aerial vehicle.

In one example, detecting the target aerial vehicle further comprises tracking a dynamic flight position with an aerial vehicle detection system.

In one example, the method comprises communicating position data to a plurality counter-attack UAVs to facilitate coordinated flight and coordinated neutralization of the target aerial vehicle. The plurality of counter-attack UAVs can be tethered together by the aerial vehicle capture countermeasure.

In one example, the method comprises coordinating flight of the plurality of counter-attack UAVs to deploy the aerial vehicle capture countermeasure from a stowed position to a deployed position In one example, the method comprises coordinating flight of the plurality of counter-attack UAVs to deploy the aerial vehicle capture countermeasure from a stowed position to a deployed position In one example, the method comprises transmitting command data, associated with the detected target aerial vehicle, from an aerial vehicle detection system to the one or more counter-attack UAVs.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 6B illustrates the system of FIG. 6A, showing the plurality of counter-attack UAVs supporting the aerial vehicle capture countermeasure in a deployed position.

FIG. 8A illustrates a system for neutralizing a target aerial vehicle comprising a plurality of counter-attack UAVs supporting an aerial vehicle capture countermeasure in a stowed position in accordance with another example of the present disclosure.

FIG. 8B illustrates the system of FIG. 8A, showing the plurality of counter-attack UAVs supporting the aerial vehicle capture countermeasure in a deployed position.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

To further describe the present technology, examples are now provided with reference to the figures.

Figure 1:
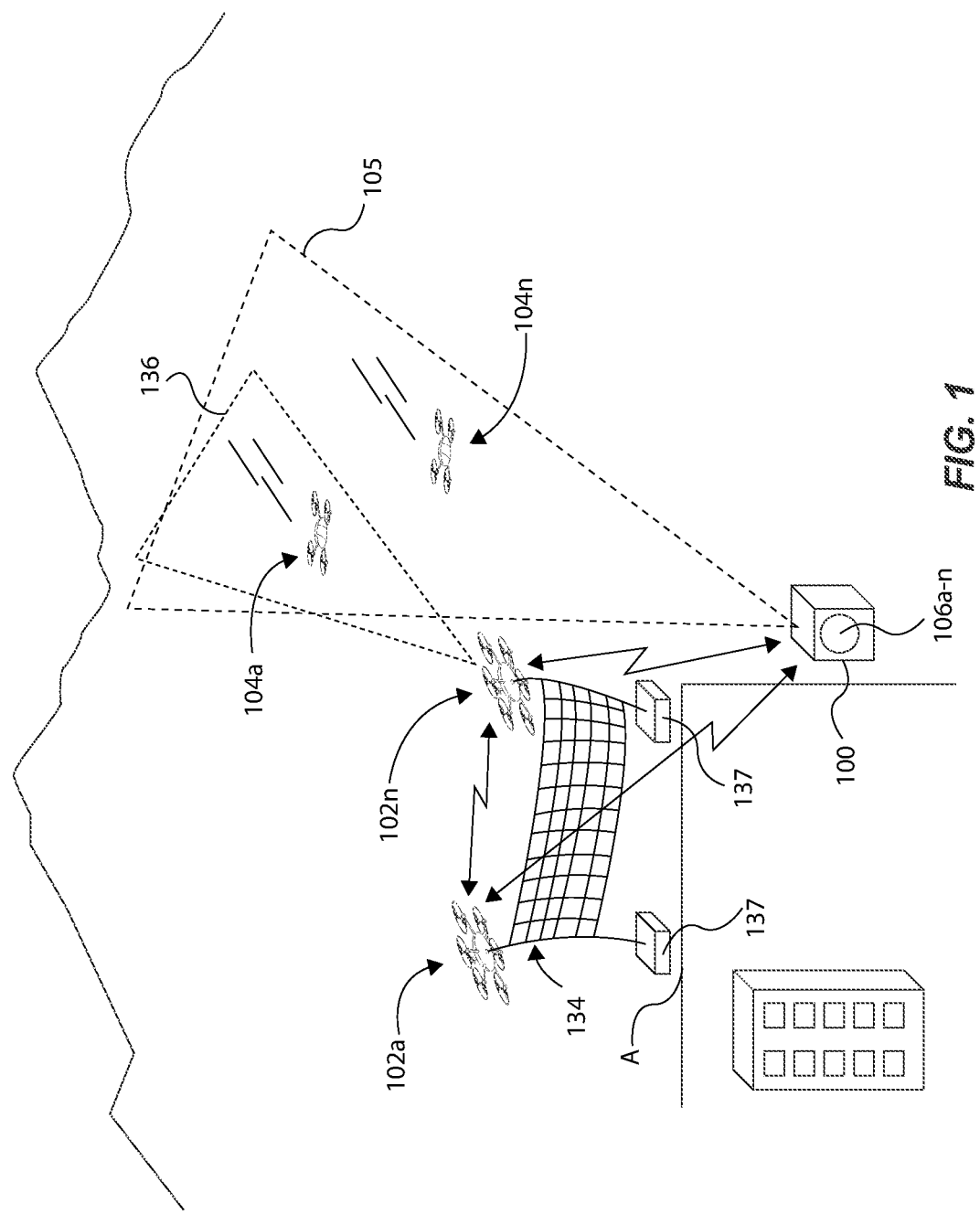
FIG. 1 is an illustration that graphically and schematically show a system for detecting and neutralizing a target aerial vehicle with a plurality of counter-attack UAVs in accordance with an example of the present disclosure.
Figure 2:
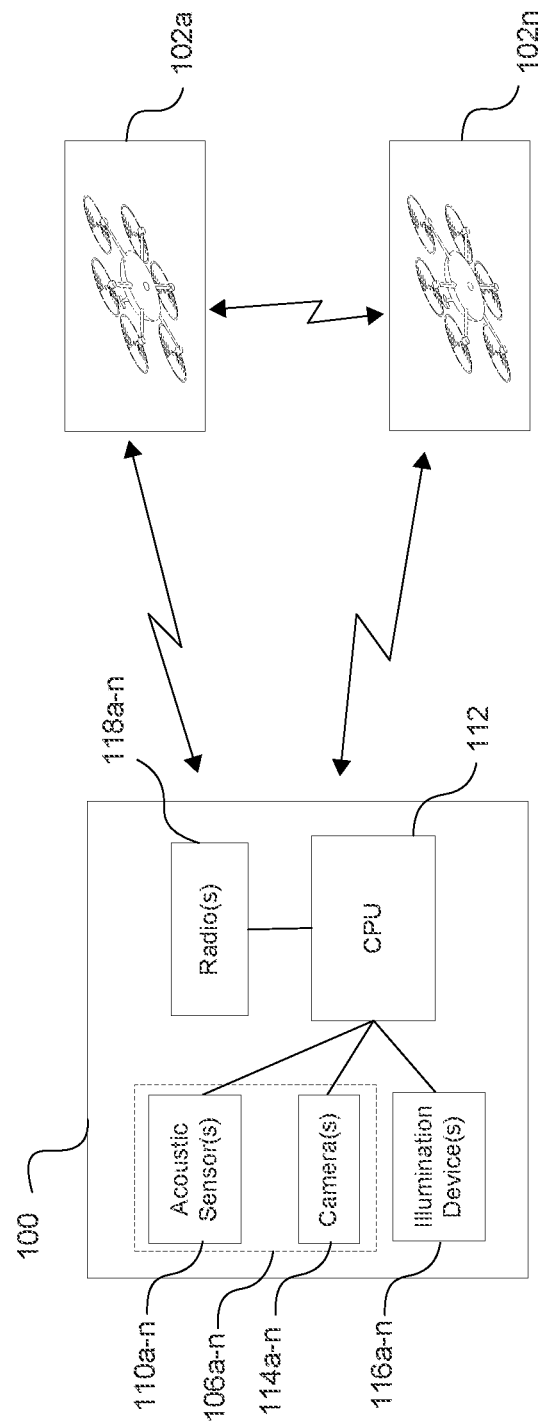
FIG. 2 is a block diagram that illustrates possible detection and communication aspects of the system of FIG. 1 in accordance with an example of the present disclosure.
Figure 3:
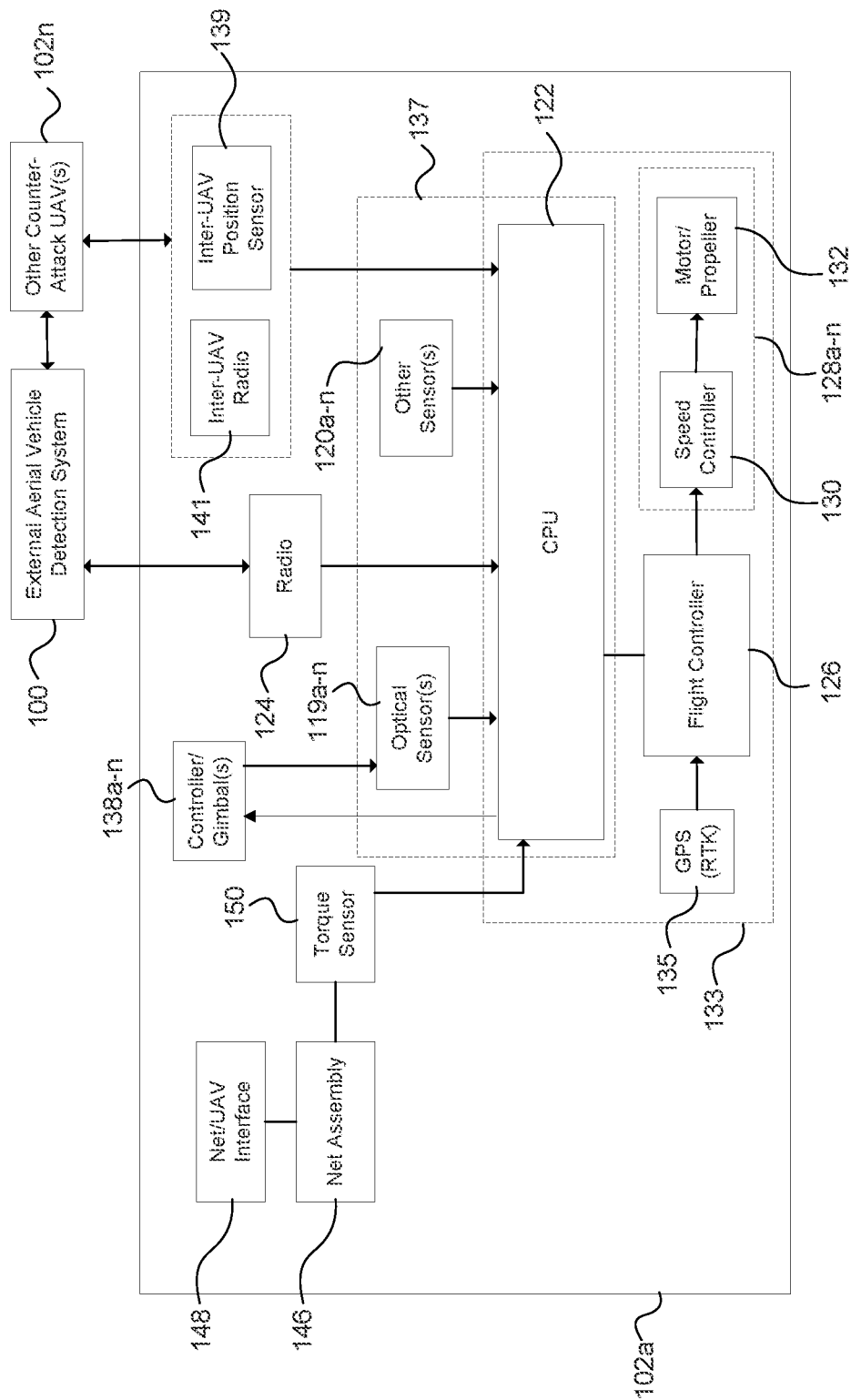
FIG. 3 is a block diagram that illustrates possible detection and operation aspects of one of the counter-attack UAVs of FIG. 1 in accordance with an example of the present disclosure.
Figure 4:
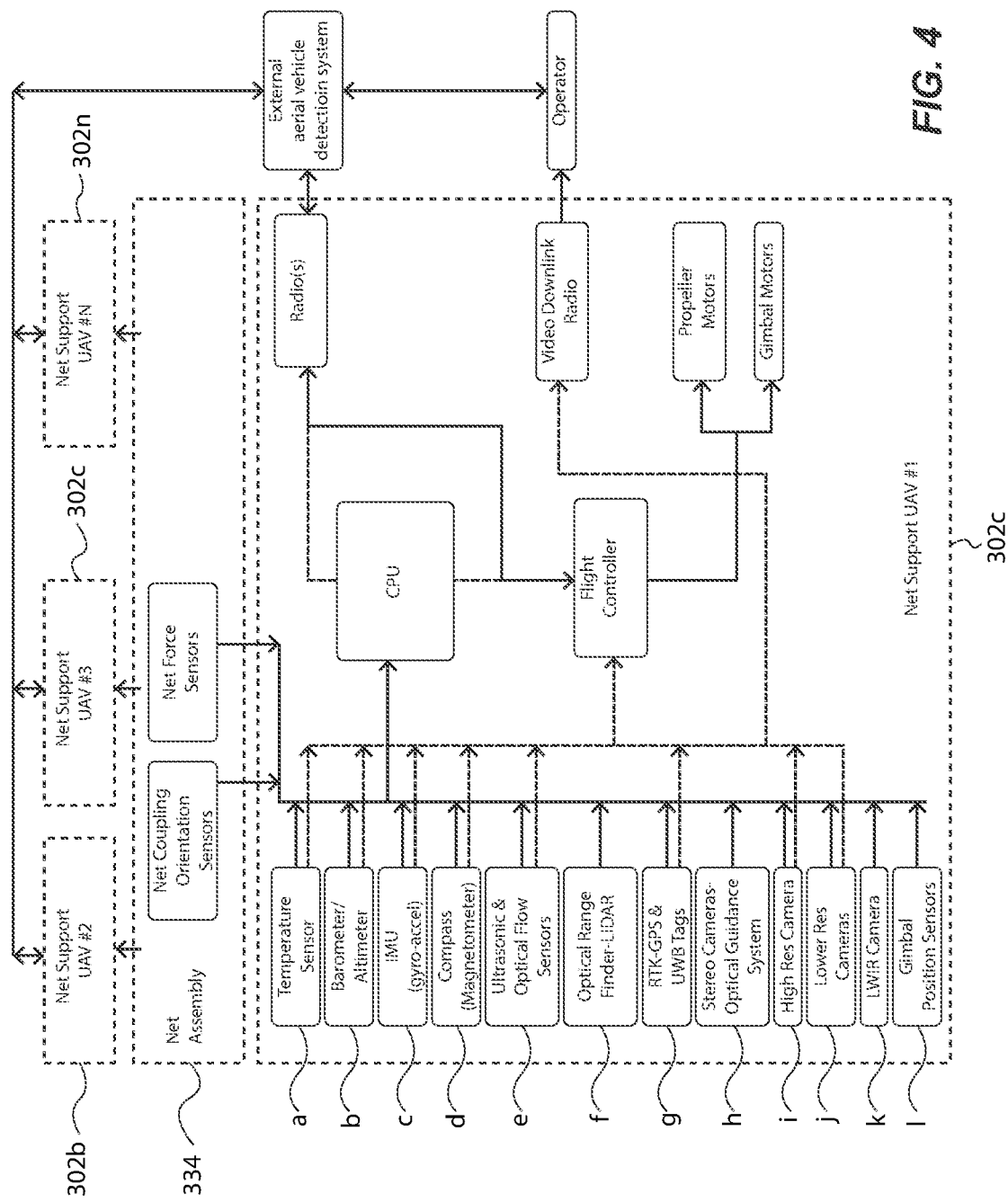
FIG. 4 is a block diagram that illustrates a system of a plurality of counter-attack UAVs supporting an aerial vehicle capture countermeasure in accordance with an example of the present disclosure.

FIG. 1 schematically and graphically illustrates a system and method for protecting an airspace area A with an external aerial vehicle detection system 100 and a plurality of counter-attack UAVs, such as example counter-attack UAVs 102a and 102b (e.g., two or more counter-attack UAVs; see FIGS. 6A-9) (up to n number of counter-attack UAVs can be utilized and are contemplated herein). The external aerial vehicle detection system 100 can be configured to communicate with at least one of the counter-attack UAV(s) 102a or 102b, or both, for the purpose of neutralizing one or more target aerial vehicle(s) (e.g., see target aerial vehicles 104a and 104b)(n number of target aerial vehicles can be neutralized) that may be encroaching or approaching the airspace area A, and that are determined to be a threat to the airspace area A. FIG. 2 is a block diagram that illustrates the components of the external aerial vehicle detection system 100 and its ability to perform detecting and real-time tracking of the target aerial vehicle(s) 104a and 104b, and to communicate command data to the counter-attack UAV(s) 102a and 102b. The command data can include any data relevant to facilitate capture of the target UAV, including, but not limited to, data pertaining to the location of the target UAV. FIG. 3 is a block diagram that illustrates a control system of the counter-attack UAV 102a (or any one of the plurality of counter-attack UAVs) for neutralizing one or more of the target aerial vehicles 104a or 104b, or both, and how the control system is operable with the external aerial vehicle detection system 100 and other counter attack UAVs. Finally, FIG. 4 is a block diagram that illustrates a system of a plurality of counter-attack UAVs 302a-n (or any one of 102a or 102b) supporting an aerial vehicle capture countermeasure tethered to a structure or ground.

As an overview, and in one example with particular reference to FIGS. 1 and 2, the system can comprise the external aerial vehicle detection system 100 configured to detect and track incoming target aerial vehicle(s) 104a and 104b (or any others) that may be a threat infrastructure and/or assets within an airspace area A (e.g., buildings, commercial airplanes, utilities, personnel). The external aerial vehicle detection system 100 can be configured to obtain and communicate information about the detected target aerial vehicles 104a or 104b, or both, such as their tracked position(s) periodically over time or in real-time, their altitude, their trajectory, and their velocities, and any other sensed or acquired information pertaining to the target aerial vehicle(s) 104a and 104b. Once obtained, this information can be communicated to at least one counter-attack UAV(s) 102a or 102b, or both (and any others), so that the counter-attack UAVs 102a and 102b can deploy or position an aerial vehicle capture countermeasure 134 (e.g., a net tethered or anchored to at least one structure 137, to ground, to a ground-based structure) to capture the target aerial vehicle(s) 104a and 104b, thereby neutralizing the target aerial vehicle(s) 104a and 104b, as further detailed below. This is what is meant by "anchored neutralization of a target aerial vehicle", namely that the counter attack UAV(s) 102a and 102b are anchored or tethered to a structure or ground via the aerial vehicle capture countermeasure 134 to neutralize flight or operation of a detected target aerial vehicle that flies into the aerial vehicle capture countermeasure 134.

The target aerial vehicles 104a and 104b can be any type, such as, but not limited to, unmanned single or multi-rotor UAVs or fixed-wing UAVs (or tilt rotor UAVs) that can be operated autonomously or manually. Alternatively, the target aerial vehicles 104a and 104b can be manned vehicles, such as a manned helicopter, manned propeller airplane, or other manned aerial vehicles. As mentioned, target aerial vehicles 104a and 104b (e.g., multi-rotor UAVs) can be significant threats because they can ascend/descend vertically up to several kilometers in airspace, can hover for many minutes, are extremely agile, fast, and maneuverable around obstacles, have small visual/IR/radar signatures, and can transport substantial payloads. Therefore, quickly detecting and tracking their position(s) within a relatively short timeframe (e.g., within a few seconds) is critical to effectively prevent breach of the airspace area A, and more importantly to protect assets associated with the monitored the airspace area A.

The external aerial vehicle detection system 100 can be supported by or associated with a ground-based structure, a vehicle (e.g., land, sea, or air), a movable platform, or other platform that can support a number of components discussed herein as associated with the external aerial vehicle detection system 100. The external aerial vehicle detection system 100 can comprise a number of sensors or platforms spaced apart from each other around an area or about different structures, and that can each be communicatively coupled to each other and/or a central computer system, for consolidating/fusing information from/to the sensor array, for increasing the probability and accuracy of target detection, identification and/or tracking, for processing data associated with target aerial vehicle(s), and for communicating command data to one or more counter-attack UAVs. Note that a plurality of aerial vehicle detection systems (e.g., 100) can be incorporated around an area to protect a larger airspace, and which can each have a computer system communicatively coupled to the computer systems of the other aerial vehicle detection systems to cooperatively monitor and protect a given airspace.

As more particularly shown in FIG. 2, the external aerial vehicle detection system 100 can comprise at least one detection sensor 106a (where, although not shown, up to n (any) number of detection sensors are contemplated, as will be appreciated by those skilled in the art) operable to collect and generate data associated with the target aerial vehicle(s) 104a-n (e.g., velocity, geolocation, altitude, trajectory, or flight path, and others). For example, the detection sensor(s) 106a can comprise one or more acoustic sensor(s), such as acoustic sensor 108a, and one or more camera(s), such as camera 110a, that are operable to collect and generate data associated with the target aerial vehicle(s) 104a-n. The detection sensor(s) 106a can comprise other target acquisition assets, such as radar device(s) 107a, LI DAR device(s) 109a, and/or binocular(s) 111a, each coupled to a CPU 112 and having the capability to measure azimuth elevation/tilt angle of a target aerial vehicle. The detection sensor(s) 106a can further comprise other sensors, such as electromagnetic signature sensors used to detect a target aerial vehicle prior to taking-off, or cameras operating over a different portion of the electromagnetic spectrum from LWIR to SWIR to visible. Other possible sensors include narrow band light emitters with detectors (e.g., cameras) that have their detection band closely matched to those of the light emitters, and/or other sensors such as narrow band light emitters (e.g., UV sources) that may make portion the target fluoresce in a different portion of the electromagnetic spectrum facilitating its detection. Note that the detection sensor(s) 106a may be able to detect multiple target aerial vehicles at the same time, wherein the CPU 112 (or multiple CPUs) can be configured to determine which sensor(s) is/are most credible or reliable for target aerial vehicle(s), and then configured to assign one or more of such sensor(s) to continue to track and monitor the target aerial vehicle(s) while un-assigning other sensor(s) from tracking particular target aerial vehicle(s). This concept is further discussed below regarding the "credibility hierarchy".

In some examples, the acoustic sensor(s) 110a can comprise one or more microphones that can detect and track target aerial vehicle(s) 104a at a large distance (e.g., up to 500 meters, or more). A database of UAV signatures can be obtained or built and accessed by a CPU 112 of the aerial vehicle detection system 110 to determine the existence and type of the detected target aerial vehicle(s) 104a. In this manner, the CPU 112, utilizing a processor, can eliminate or ignore the signatures of any (friendly) counter-attack UAV(s) 102a and/or 102b that may be in flight while detecting the signatures of target aerial vehicle(s) 104a-n (assuming the "friendly" and "enemy" UAVs are different types of UAVs, or that the CPU 112 is programmed to differentiate between the two, such as based on known positions of counter-attack UAVs).

In some examples, one or more sensor(s) or camera(s) (e.g., see sensor 114a, although n number of sensors are contemplated) (e.g., IR, optical, CCD, CMOS) can be incorporated as one or more of the detection sensors (e.g., see detection sensor 106a, although n number of detection sensors are contemplated) of the external aerial vehicle detection system 100. For instance, infrared (IR) camera(s) can be implemented into the system and directed toward a particular airspace for viewing possible incoming target aerial vehicles. IR cameras are useful in this system because they can assist to overcome environmental problems experienced by other sensors (e.g., optical cameras), because IR cameras can operate in the dark or in foggy, dusty, or hazy conditions. IR cameras utilized in this system have the additional advantage that the IR signal from a target aerial vehicle (e.g., a UAV) is very different from that of birds in flight. IR cameras based on the shortwave infrared (SWIR) spectrum can interact with objects in a similar manner as visible wavelengths, as it is reflective, bouncing-off objects. As a result, SWIR light has shadows and contrast in its imagery. Images from a SWIR camera are comparable to visible images in resolution and detail. An atmospheric phenomenon called night sky radiance or night glow emits five to seven times more illumination than starlight, nearly all of it in the SWIR wavelengths. Because of this, SWIR cameras can see objects with great clarity on moonless nights. Such SWIR camera(s) can be incorporated into the present external aerial vehicle detection system 100 (and/or into the counter-attack UAV(s)). Longwave infrared (LWIR) cameras are more optimal for outdoor use because they are less affected by radiation from the Sun than with SWIR cameras. As such, LWIR camera(s) can be incorporated into the external aerial vehicle detection system 100 to benefit from the advantages of outdoor use to detect and track target aerial vehicle(s). Other camera(s), such as optical cameras (e.g., HD, 4K), can also be incorporated as detection sensor(s) 106a of the external aerial vehicle detection system 100 to assist with detection and tracking the dynamic position of target aerial vehicle(s) 104a and 104b (or any others).

In some examples, one or more telephoto lenses can be operable and incorporated with one or more of the SWIR and LWIR camera(s), and/or optical camera(s), and can be mounted on high-resolution motorized gimbals (e.g., 2 or 3-axis gimbals) associated with the external aerial vehicle detection system 100 to assist with detecting and tracking the dynamic position(s) of target aerial vehicle(s) 104-n, including the angular position and/or azimuth elevation, in some cases depending on the type of sensor employed. Two or more detection sensors described herein can be used to compute range of a target aerial vehicle. Moreover, a particular camera (e.g., IR, optical) can be used in conjunction with an on-board (or remotely supported) laser range finder to determine the position of the target aerial vehicle in three-dimensional space (e.g., distance, azimuth angle, and elevation angle). Such telephoto lenses and gimbals can each be operated to establish the pointing position (and to dynamically modify the pointing position) of the associated camera, and therefore adjust a field-of-view (FOV) 105 (for instance) of a particular camera to keep a monitored target aerial vehicle 104a centered about the camera (the same is true for target aerial vehicle 104b being centered about a FOV 105b of a camera or sensor of the system 100). These telephoto lenses and gimbals can be operated manually or autonomously (discussed below) to continuously track a dynamic flight position or path of a particular target aerial vehicle. In one example, a 360-degree camera device (having IR or optical camera(s)) could also be integrated with the external aerial vehicle detection system 100 to monitor an entire 360-degree air space, which may or may not require a gimbal for operation to monitor such airspace. In some examples Radar and LIDAR may be used to detect, track and determine position (range, azimuthal and elevation), and/or geolocation, and speed of the target.

Computer vision algorithms stored and processed by the CPU 112 of the external aerial vehicle detection system 100 can be implemented for automatic detection and tracking of the target aerial vehicle(s) 104a-n. Such computer vision algorithms can "pull" a moving object out of a static background and classify it by shape (i.e., feature detection). Other mechanisms for classification of target aerial vehicle(s) 104a-n include using neural networks, which are computer algorithms designed to mimic the workings of the human brain, that are trained to recognize known/stored images of profiles that may be similar to the particular detected target aerial vehicle(s) 104a-n. Those skilled in the art will recognize that various known algorithms can be implemented to achieve this functionality, including "convolutional neural network" (CNN) combined with fast detection, such as provided by the You Only Look Once (YOLO) detection architecture known in the industry. Once the target aerial vehicle(s) are detected by the computer vision system (e.g., CNN, YOLO), the gimbal orientation supporting the camera can be used to determine azimuthal and elevation of the target aerial vehicle. Information from multiple computer vision systems may be combined to calculate range in addition to azimuthal and elevation angle. The target classification and position information collected using the computer vision system can further be combined/fused with information collected from other sensor(s) (e.g., 106a) to increase the likelihood of detection, and/or accuracy of classification of the target aerial vehicle, and/or tracking of the position of the target aerial vehicle.

In some examples, Phase-Based Video Motion processing technology can be incorporated with the external aerial vehicle detection system 100 (e.g., software processed by the CPU 112). Phase-Based Video Motion processing technology amplifies very small motions that otherwise could not be detected. This technology is further described in U.S. Patent Pub. No. US20170000356A1 filed Jul. 1, 2015, which is incorporated by reference herein. Thus, small vibration motions inherent to target aerial vehicles (e.g., UAVs) can be detected, which can overcome the issues with using only cameras to detect and track target aerial vehicles. For instance, as similarly discussed in U.S. Patent Pub. No. US20170000356A1, a method executed by a processor (e.g., CPU 112) receives a video as input (e.g., video of a target aerial vehicle) and exaggerates subtle changes and micromotions. To amplify motion, the method does not perform feature tracking or optical flow computation, but merely magnifies temporal changes using spatio-temporal processing. This Eulerian based method, which temporally processes pixels in a fixed spatial region, reveals informative signals and amplifies small motions in real-world videos. The Eulerian-based method begins by examining pixel values of two or more images. The method then determines (with the processor) the temporal variations of the examined pixel values. The method is designed to amplify only small temporal variations. While the method can be applied to large temporal variations, the advantage in the method is provided for small temporal variations, such as when a target aerial vehicle is detected at long ranges. Therefore, the method can be optimized when the input video has small temporal variations between the images of a particular target aerial vehicle while in flight. The method can then apply signal processing to the pixel values. For example, signal processing can amplify the determined temporal variations, even when the temporal variations are small, such as vibrations of a target aerial vehicle as captured in successive images by an optical sensor of an external vehicle detection system of the present disclosure.

Once the target aerial vehicle(s) 104a and 104b have been identified in successive frames of video (e.g., using IR and/or 4K optical cameras, and/or other sensors such as Radar), autonomously tracking a dynamic flight position or path of the target aerial vehicle(s) 104a and 104b and fusing position information provided by different sensing methodology (e.g., camera and Radar) can be performed by utilizing a Kalman filter, extended Kalman filter, particle filters, or another variation of a Bayesian filter. These filters work by taking an estimate of the velocity, position, and orientation of the particular target aerial vehicle 104a, for instance, and then predicting where the target aerial vehicle 104a will be in the next frame of video and/or Radar track. Then, the position of the target aerial vehicle 104a in the next video frame is compared with the predicted position, and the estimates for the velocity, position, and orientation are updated. During such tracking with one of the cameras 114a, a feedback control loop can autonomously and continually adjust the gimbal (supporting the particular camera) to keep the target aerial vehicle 104a centered about the FOV 105 of the camera of the external aerial vehicle detection system 100. This facilitates or maintains continuous tracking of a dynamic flight position of a particular target aerial vehicle. Common algorithms include centroid tracking, edge detection, feature-based algorithms, and area correlation tracking. Using this system of cameras and filters, the external aerial vehicle detection system 100 can detect and track, in real-time, a flight position or path of a particular target aerial vehicle.

Indeed, a number of detection sensors 106a can be positioned about or supported by a structure or platform of the external aerial vehicle detection system 100 in a manner that the detection sensors 106a can cooperatively and collectively monitor a perimeter of up to 360 degrees associated with an airspace around the position of the external aerial vehicle detection system 100 to protect an area (e.g., a 500+ m radius of coverage of an airspace). Alternatively, the detection sensors 106a can be mounted and configured to point toward a particular area of interest less than 360 degrees of coverage, such as through a canyon, or other particular egress of importance relative to the protected area A.

In some examples, the external aerial vehicle detection system 100 can comprise at least one illumination device (see illumination device 116a), such as a laser or high-powered LED, operable to illuminate the detected target aerial vehicle 104a (while continuously tracking the target aerial vehicle 104a, as detailed above). A particular illumination device 116a can be mounted on a gimbal device (e.g., 3-axis) that is operable to modify a pointing position or direction of the illumination device to continuously direct the illumination device toward the target aerial vehicle 104a for constant illumination. In this manner, a controller (operatively coupled to the CPU 112) can be operated to control said pointing position based on the tracked position or flight path of the target aerial vehicle 104a. As will be discussed below, the counter-attack UAVs 102a and 102b can each have a band pass filter (on a camera) to detect only the narrow frequency band of light illuminated onto the target aerial vehicle 104a by the illumination device 116a of the external aerial vehicle detection system 100.

In another example of a detection sensor of the external aerial vehicle detection system (100), a telescope or a pair of human use binoculars equipped with azimuthal and elevation angle sensors may be used to locate a potential target aerial vehicle and transmit partial position information to the counter-attack UAV(s) (and/or to a CPU of the external aerial vehicle detection system). In another example, the telescope or binocular based detection system can be equipped with a range sensor, such as a laser range finder, and the information provided by this range sensor can be combined with that provided by the azimuthal and elevation angle sensors, thereby allowing the position of the target UAV to be tracked in 3D.

Once the target aerial vehicle 104a is detected as entering a monitored airspace (e.g., within a 500 m radius of the external aerial vehicle detection system 100), the external aerial vehicle detection system 100 can transmit command data to at least one counter-attack UAV(s) 102a or 102b, or both, for purposes of neutralizing the target aerial vehicle 104a with a particular aerial vehicle capture countermeasure (e.g., monofilament netting). The command data can be generated by the CPU 112 and transmitted via radios (e.g., see radio 118a, although n number of radios are contemplated) to at least one counter-attack UAV(s) 102a or 102b, or both. Optionally, a bi-directional free space communication link 113 can be utilized in replacement of (or to supplement) radios 118a-c. The command data can include location data, and can be associated with the detected position of the target aerial vehicle 104a, which can include a flight path, altitude, longitude, latitude, GPS coordinates (degrees, minutes, seconds), and/or other data associated with a spatial position and/or velocity of the target aerial vehicle 104a. The command data can also include intercept data, such as information or instructions that command at least one of the counter-attack UAV(s) 102a or 102b, or both, to fly at a certain velocity to capture a particular target aerial vehicle.

The command data transmitted to the counter-attack UAV by the external aerial vehicle detection system 100 can also include aerial vehicle capture countermeasure deployment command data, such as information or instructions that instruct or command the counter-attack UAV(s) 102a and 102b to deploy or move the particular aerial vehicle capture countermeasure 134 at/to a particular location, direction, and time, for instance. The command data can further include target aerial vehicle detection data, such as position data or information (discussed above), and even information other than position information, such as identification information about the type of UAV of the target aerial vehicle(s) 104a and 104b detected by the detection sensor(s) 106a. Such information can aid the external aerial vehicle detection system 100 and/or the counter-attack UAV(s) 102a and 102b to determine the size, type (e.g., fixed or rotary wing), on-board features, and/or performance capabilities of a particular target aerial vehicle, for instance, which can affect the type of countermeasure to implement to neutralize the target aerial vehicle.

The command data can also include counter-attack UAV control data, which can include instructions (from the external aerial vehicle detection system 100) for controlling some or all aspects of the counter-attack UAVs 102a and 102b. In this manner, the counter-attack UAVs 102a and 102b can be "dummy" drones that have disabled or overridden internal flight controls, so that the external aerial vehicle detection system 100 can control flight, deployment, sensor pointing, etc. of the counter-attack UAVs 102a and 102b. Therefore, the external aerial vehicle detection system 100 can detect and monitor the position or flight path of the target aerial vehicle 104a, for instance, with one detection sensor and processing unit, while also monitoring and controlling the respective positions and operation of the counter-attack UAVs 102a and 102b.

Using at least some of such command data, the counter-attack UAV(s) 102a and 102b can be operated/navigated to autonomously move or deploy the aerial vehicle countermeasure device 134, as discussed below regarding the examples of FIG. 6A-9. This system discussed regarding FIGS. 1 and 2 is particularly advantageous in cases where the target aerial vehicle 104a may be several kilometers away from the airspace area A, and even several kilometers in altitude. This is because it may be difficult for an individual counter-attack UAV to know where to "look" in a plausibly large amount of airspace and at possible long ranges. This is because many on-board cameras of a counter-attack UAV can only detect, identify, and classify targets at larger ranges (e.g., greater than 100 m), if the FOV is significantly reduced (e.g., 10 degrees or less).

As discussed above, the external aerial vehicle detection system 100 can operate the plurality of detection sensors (e.g., two or more of detection sensors 106a) to generate position data associated with a target aerial vehicle. The CPU 112 can then operate to eliminate position data associated with one or more of the detection sensors based on a credibility hierarchy associated with the plurality of detection sensors. Such credibility hierarchy can be based on environmental conditions. For instance, when operating during daytime and with no clouds, the credibility hierarchy could include position data derived from the following list of prioritized detection sensors: (1) an optical camera, (2) binoculars, (3) IR camera(s), (4) a radar device, (5) a LIDAR device, (6) an acoustic sensor, (7) an illumination device, and (8) other sensors. More specifically, once the CPU 112 has determined or knows of such environmental conditions, the CPU 112 can eliminate position data associated with sensors 3 through 7 (and/or un-assign such sensors from operating), while using position data generated from (1) the optical camera and (2) the binoculars (e.g., assigned detection sensors). Ideally, position data generated from the optical camera(s) would be the most credible during daytime in daylight without clouds, birds, etc. However, if signals generated from (2) the binoculars are more credible for any particular reason (e.g., the binoculars have less intermittent signal loss than the optical camera), then the CPU 112 can eliminate the position data generated from the optical camera, and use the position data generated from the binoculars, and then communicate the position data to one or more counter-attack UAVs. Such processing of eliminating certain position data can occur many times per minute, so that the best tracking information is generated and processed by the external vehicle detection system 100 for transmitting to the counter-attack UAVs, thereby improving or increasing the chances of intercepting and capturing the detected target aerial vehicle(s).

In another example of credibility hierarchy, assume the operating conditions are at night and with cloud cover, such that very little light is emitted to an area to be monitored by the external vehicle detection system 100. Here, the credibility hierarchy may be as follows: (1) IR camera(s), (2) an acoustic sensor, (3) a radar device, (4) a LI DAR device, (5) an illumination device, (6) other sensors, (7) optical camera, and (8) binoculars. This is because at night, IR camera(s) may generate the most credible position data, as discussed above. Thus, the CPU 112 can eliminate position data generated from detection sensors 4 through 8, and then analyze the signals generated from detection sensors 1 through 3 to determine the most credible position data generated. For instance, if the acoustic sensor is getting interference from other sounds, and if the radar device is affected by weather pattern, then the CPU may only use position data from the IR camera(s) as the most credible position data (and only data) for transmitting to the counter-attack UAV(s) to increase the chances of intercepting and capturing the detected target aerial vehicle(s).

It should be appreciated by those skilled in the art that the CPU 112 can include a tangible and non-transitory computer readable medium comprising one or more computer software modules configured to direct one or more processors to perform the method steps and operations described herein.

As illustrated in FIG. 3, a particular counter-attack UAV 102a (for instance) can comprise one or more optical sensors (e.g., see optical sensor 119a), and/or other detection sensors 120. The optical sensors 119 and the other sensors 120 can be operatively coupled to a CPU 122 for processing data generated by the optical sensors 119 and the other sensors 120 associated with the presence or position of the target aerial vehicle 104a, for instance.

Based on the collected data generated from operating one or more of such sensors, the flight controller can be configured to operate one or more propellers/motors and gimbal devices for navigation/flight of the counter-attack UAV based on a detected position or flight path of at least one target aerial vehicle.

The counter-attack UAV 102a can further comprise a wireless communication device, such as an RF radio 124 (e.g., Mobilicom software defined radio or similar radio), that can wirelessly receive the command data from the external aerial vehicle detection system 100, and then can transmit the command data to the CPU 122 for processing. The radio 124 can be used to communicate a video feed, captured by the optical sensor(s) 119, back to the external aerial vehicle detection system 100 (or to another external computer system, or even to a manually-monitored display).

Based on the received command data, the counter-attack UAV 102a can operate autonomously to fly in a particular direction and velocity to move or deploy the aerial vehicle countermeasure device 134, based on a particular tracked flight path the target aerial vehicle 104a, to capture the target aerial vehicle 104a in the aerial vehicle countermeasure device 134. More specifically, the counter-attack UAV 102a can comprise a flight controller 126 electrically coupled to the CPU 122 for receiving command signals associated with the command data processed by the CPU 122. The flight controller 126 can then control the various components of the counter-attack UAV, such as rotor assemblies (e.g., see rotor assembly 128), gimbals or gimbal assemblies, and any other components or systems. The rotor assemblies can each comprises an electronic speed controller 130 and a motor/propeller 132 to cause the counter-attack UAV 102a to move to a particular position and/or at a certain velocity to appropriately move the aerial vehicle countermeasure device 134. Thus, at least the CPU 122, the flight controller 126, and the rotor assemblies 128 can define a flight control system 133 that is operable to facilitate flight of the counter-attack UAV 102a to control and orient the position of the aerial vehicle countermeasure device 134, as further described herein.

Updated command data can be continuously communicated to at least one of the counter-attack UAVs 102a and 102b so that the flight controller 126 can control flight of the counter-attack UAV 102a, as corresponding to a tracked flight path or position of the target aerial vehicle 104a. In this manner, the counter-attack UAV 102a can know when and where to move the tethered aerial vehicle countermeasure device 134, as being tethered to a structure or the ground.

The optical sensors 119 (and/or the other sensors 120) and the CPU 122 can define an on-board aerial vehicle detection system 137 that is operable to detect the target aerial vehicle 104a on its own, in one example (e.g., without the assistance of an external aerial vehicle detection system). Thus, the counter-attack UAV 102a can detect the target aerial vehicle 104a (assuming it is within range), and then the CPU 122 can generate command data, and then transmit signals associated with the command data to the flight controller 126 to facilitate flight of the counter-attack UAV 102a (whether such flight is static for maintaining a position of a tethered net, or whether such flight is dynamic to deploy or otherwise move a tethered net). Such on-board aerial vehicle detection system 137 can be operated in conjunction with the external aerial vehicle detection system 100 to track a dynamic flight position of the target aerial vehicle 104a, so that if the external aerial vehicle detection system 100 is unable to do such, then the on-board aerial vehicle detection system 137 can continue to such on its own as a back-up detection system.

Concurrently (or alternatively) before the counter-attack UAV 102a is operated to move (or maintain the position of) the aerial vehicle countermeasure device 134, command data from the external aerial vehicle detection system 100 can be processed by the CPU 122 of the counter-attack UAV 102a to control a pointing position of the optical sensor(s) 119 to "tell" the counter-attack UAV 102a where to "look" in airspace to find the target aerial vehicle 104a, in one example. Specifically, one of the optical sensors 119 can be rotatably mounted to a flight body or platform of the counter-attack UAV 102a by one or more gimbal device(s) 138. The CPU 122 can then transmit control signals to gimbal controller(s) that control operation of the gimbal device(s) 138 (e.g., 3-axis gimbals) to establish and control a pointing position of the optical sensor 119a (i.e., to point the particular camera toward the detected target aerial vehicle 104a). As long as the target aerial vehicle 104a is within a detection range of the camera (e.g., up to 150 m, or more in some examples), the counter-attack UAV 102a can detect and track the position of the target aerial vehicle 104a on its own and without the assistance of the external aerial vehicle detection system 100, if necessary. Any of the other counter-attack UAVs exemplified herein can have such features and functionality as well.

In some examples, the other sensors 120 can comprise one or more radar device(s), such as compact phased array radars and automotive radars. Small phase array radar systems, such as the Echodyne Mesa-X7, Fortem Technologies TrueView R20, and automotive radar systems like the Delphi Automotive Radar, can be incorporated in the counter-attack UAV 102a, which have a range of more than 200 m for small targets, such as small consumer drones (e.g., DJI Phantom 4). A radar array could also be used as a detection sensor of the external aerial vehicle detection system 100 for detection of a target aerial vehicle.

In some examples, in cases where the external aerial vehicle detection system 100 is unable to detect the target aerial vehicle 104a (e.g., due to weather, or intermittent signal losses), the counter-attack UAV 102a may be able to utilize its components (FIG. 3) to detect and track the position of the target aerial vehicle 104a.

Figure 6A:
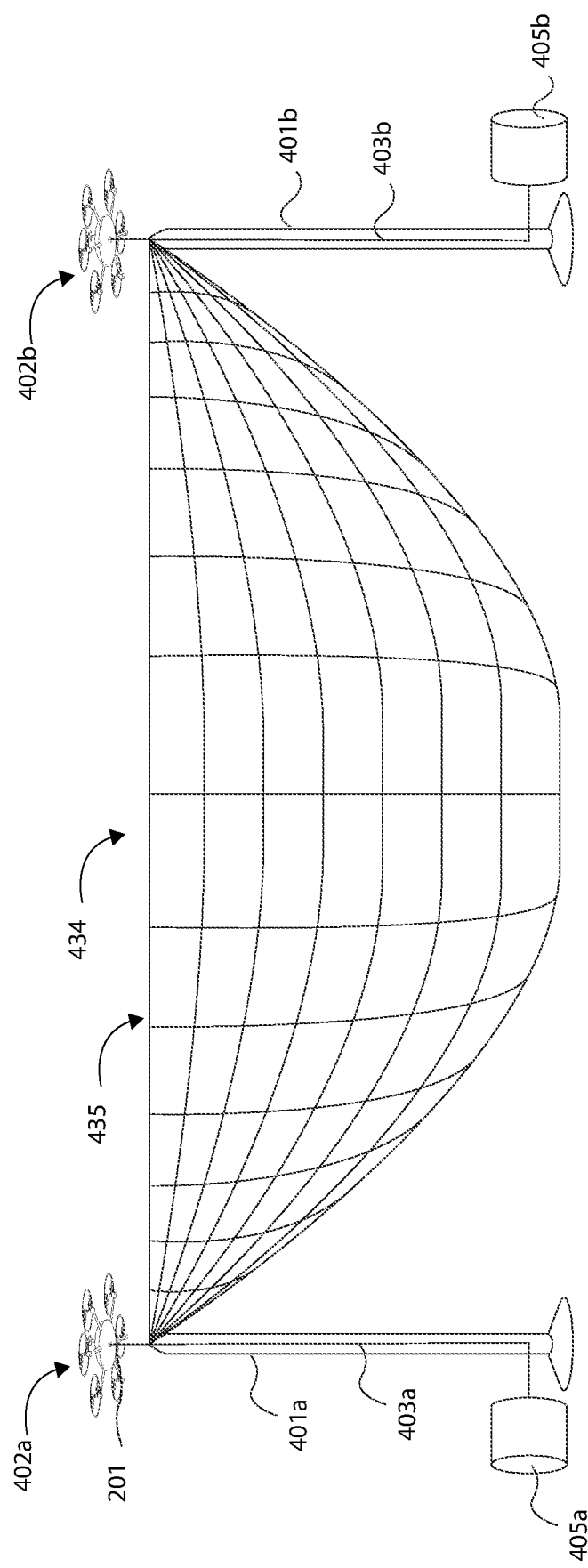
FIG. 6A illustrates a system for neutralizing a target aerial vehicle with a plurality of counter-attack UAVs supporting an aerial vehicle capture countermeasure in a stowed position in accordance with an example of the present disclosure.

The various components schematically shown in FIG. 3 can be supported about a flight body 201 of the counter-attack UAV 102a (e.g., FIG. 6A). The flight body 201 can comprise a flight body, or a portion thereof, that structurally supports the components of FIG. 3 (and that also supports a battery powering such components).

In one example, a single counter-attack UAV can be operated to move and support an aerial vehicle capture countermeasure, as tethered to a structure or ground surface. In this manner, a horizontal support member (not shown) can be coupled along a top area of the aerial vehicle capture countermeasure 134 (e.g., the net), so that the single counter-attack UAV can support a two-dimensional net on its own, for instance.

As illustrated in FIG. 1, and in one example, once the target aerial vehicle 104a is flown within a certain detectable distance of the counter attack UAV 102a (e.g., 10-150 m), such that the target aerial vehicle 104a is within a FOV 136 of the optical sensor(s) 119, the counter-attack UAV 102a may utilize its on-board optical sensor(s) 119 to continuously track the dynamic position or flight path of the target aerial vehicle 104a. For example, a particular on-board optical sensor can comprise a video camera, mounted on a gimbal device (supported and operated by the counter-attack UAV 102a), that can be operated to identify and track the target aerial vehicle 104a, similarly as discussed above regarding the detection sensors of the external aerial vehicle detection system 100. For instance, a Kalman filter (or another variation of a Bayesian filter) can be executed as an algorithm by a processor of the CPU 122, and that uses digital signals generated by the video camera to estimate and predict the velocity, position, and orientation of the particular target aerial vehicle, and then executes a feedback control loop that autonomously and continuously adjust the gimbal device to keep the target aerial vehicle centered about the FOV 136 of the video camera, for instance. Such camera could be equipped with a long or medium focus telephoto lens to maximize the distance at which a target aerial vehicle may be identified and tracked at ranges up to 150 m to 300 m, in some examples, but at the cost of reducing the FOV of the camera. However, because the external aerial vehicle detection system 100 can transmit command data associated with a detected position of the target aerial vehicle 104a to the counter-attack UAV 102a, a narrower FOV can be acceptable in some instances, if it means the on-board camera has a longer range of detection and tracking capabilities. This manner of tracking the target aerial vehicle 104a with the counter attack UAV 102a can be advantageous in examples where the counter attack UAV(s) 102a and 102b can move the aerial vehicle capture countermeasure 134 to a particular location or orientation (see the examples of FIGS. 6A-8B discussed below).

In some examples, as shown in FIG. 3, the counter-attack UAV 102a can be equipped with an optical sensor or camera (e.g., 119) having a narrow band pass filter, and accompanied by an optical frequency matched illumination source (e.g., high-power LED). The LED can be directed to illuminate the target aerial vehicle 104a, while reducing background contributions, so that the camera and filter can better detect and track the target aerial vehicle 104a. Such on-board camera and narrow band pass filter can also be used to detect only that frequency of light illuminated onto a target aerial vehicle by the illumination device 116a of the external aerial vehicle detection system 100, as initially mentioned above regarding the description of FIG. 1.

With reference to FIG. 3 (as also applicable to FIG. 4), the counter-attack UAV 102a can have a GPS device 135 (e.g., a real-time kinematic (RTK) GPS) coupled to the flight controller 126 for determining and updating a position of the counter-attack UAV 102a (e.g., to other counter-attack UAVs). The counter-attack UAV 102a can comprise an inter-UAV swarm communication system comprising an inter-UAV radio 141 coupled to the CPU 122 for communication between other counter-attack UAV(s) (e.g., counter-attack UAV 102b) to facilitate coordinated flight configurations, as detailed below regarding FIG. 4 and elsewhere herein. The inter-UAV swarm communication system can further comprise an inter-UAV position sensor 139 (e.g., ultra-wideband (UWB) tag) operably coupled to the CPU 122 to assist with determining individual position of the counter-attack UAV 102a to facilitate coordinated flight configurations with other counter-attack UAV(s) (e.g., UAV 102b), as detailed below.

In some examples where the aerial vehicle capture countermeasure comprises a net, the counter-attack UAV 102a can support a net assembly 146 which can be coupled to a flight body or body of the counter-attack UAV 102a via a net/UAV interface device 148. A force sensor 150 can be operably coupled to the net assembly 146 and electrically (wired or wireless) coupled to the CPU 122 to sense a force exerted on the net assembly 146, whether from wind, birds, UAVs, etc. An inertial measurement unit (IMU) 131 can be coupled between the CPU 122 and the net assembly 146 for measuring force and/or angular rate of the net relative to the tethered counter-attack UAV.

FIG. 4 illustrates a block diagram of a system of a plurality of counter-attack UAVs (e.g., see counter-attack UAVs 302a-d), and showing details of a particular example counter-attack UAV 302a (the others capable of being similarly configured), for detecting and tracking a target aerial vehicle, and for navigation of the counter-attack UAV 302a. The counter-attack UAV 302a can have some or all of the similar features of the counter-attack UAV 102a described regarding FIG. 3. The counter-attack UAV 302a can be coupled to the plurality of counter-attack UAVs 302b-d by an aerial vehicle capture countermeasure 334, such as a net assembly that is tethered to a ground or structure (see e.g., FIGS. 1 and 6A-9). It will be appreciated by those skilled in the art that at least two counter-attack UAVs (e.g., 302a and 302b) may be required to support and deploy a particular net assembly, for instance. However, in some configuration a single counter attack UAV may be used to deploy a particular net assembly.

The counter-attack UAV 302a can comprise a number of sensors operatively coupled to a CPU for processing data collected by the sensors (the CPU can have a GPU). As some examples, the counter-attack UAV 302a can comprise some or all of the following sensors: (a) a temperature sensor; (b) a barometer/altimeter; (c) an inertial measurement unit (IMU) (gyro-accelerometer); (d) a compass (magnetometer); (e) ultrasonic and optical flow sensors; (f) an optical range finder (e.g., LIDAR by Leddartch, LIDAR by Velodyne, or LIDAR by Quanergy); (g) RTK-GPS and UWB tags; (h) stereo cameras (optical guidance system); (i) high resolution camera(s); (j) low resolution camera(s); (k) LWIR camera(s); and (l) gimbal position sensors, as well as any others apparent to those skilled in the art. Sensors (a-e), (g), (i), and (j) can also be coupled to a flight controller and a video downlink radio, as illustrated. Based on the collected data from such sensors, the flight controller can be configured to operate one or more propellers/motors and gimbal devices for navigation of the counter-attack UAV 302a based on a (dynamic) position of a target aerial vehicle, similarly as described with reference to FIGS. 1-3.

One or more radio(s) (e.g., telemetry radio) can be coupled to the flight controller and to the CPU for transmitting data between the counter-attack UAV 302a and the external aerial vehicle detection system 100 (see e.g., FIG. 1). A video downlink radio can also be communicatively coupled between the counter-attack UAV 302a and a human operator to view a video feed on a display, for instance. A human operator can be associated with the external aerial vehicle detection system 100 for monitoring and supervising activity of the system.

The aerial vehicle capture countermeasure 334 can be a net assembly having the features shown in FIG. 4, or the net assembly can be merely a net (or other entangling element) coupled to each of the counter-attack UAVs 302a-d. As a net assembly, the aerial vehicle capture countermeasure 334 can comprise net coupling orientation sensors coupled between the actual netting material and each of the counter-attack UAVs 302a-d. Each net coupling orientation sensor can collect data associated with the respective position or orientation of the net relative to the respective counter-attack UAVs 302a-d, and then transmit such collected position/orientation data to the respective CPU for processing in order to control navigation of each counter-attack UAVs 302a-d in a coordinated manner, as further discussed below. Similarly, net force sensors can be coupled between the net and respective counter-attack UAVs 302a-d to collect data associated with the respective forces acting on the net (e.g., wind drag, and/or pulling forces from other counter-attack UAVs 302a-d) relative to the respective counter-attack UAVs 302a-d. Such collected force data can be transmitted to the respective CPU for processing in order to control navigation of each counter-attack UAVs 302a-d in a coordinated manner, as further discussed below. The term "net" as used with the various sensors is merely an example and not meant to be limiting to any particular aerial vehicle capture countermeasure exemplified herein.

It should be appreciated that each of the other counter-attack UAVs 302b-d can have the same features described regarding the counter-attack UAV 302a shown in FIG. 4. Note that each counter-attack UAV 302b and 302c (and 302d) can support and operate a net orientation sensor and a net force sensor, as detailed above.

During flight, the position of each counter-attack UAV relative to each other is important when determining and controlling their respective navigations and their collective dynamic flight path (or generally static flight position), so that they do not impact each other or become entangled in a supported net, for instance, and so that they can effectively capture a target aerial vehicle. In some examples, each counter-attack UAV of the present disclosure can have one or more of a GPS device, an RTK-GPS device, UWB tags, visual inertial odometry (VIO) technology, and/or a fusion of GPS and VIO (see e.g., FIG. 3). Most available UAVs (e.g., drones) have GPS incorporated in addition to IMUs, and when GPS is not available (e.g., insufficient number of satellites in-view), the UAV flies with its IMU alone, and generally must rely on commands from an operator for navigation (unless visual tracking is available on the UAV). The accuracy of standard GPS is approximately +/−1 m to +/−5 m, but there are many sources of error that give rise to the position uncertainty. Vertical accuracy is generally about half that of horizontal. Those GPS receivers that have WAAS (Wide Area Augmentation System) enabled will fall within +/−1 m of uncertainly, in the best cases. Thus, many UAVs can fly in a coordinated configuration within about 2 m of each other with some degree of accuracy using GPS technology.

Another type of GPS that uses corrections to achieve better positional accuracies is RTK (real-time kinematic) GPS. RTK GPS may use bands from GNSS (American), as well as others such as GLONASS (Russian) and Galileo (European Union) satellite constellation. The important distinction is an added radio link from a ground based station (e.g., an external aerial vehicle detection system 100) sending corrections from a known location. This technique can achieve better than +/−5 cm, and typically +/−2 cm positional accuracy, for a swarm or plurality of counter-attack UAVs operating in a coordinated flight manner. Because of this, and in one example, each counter-attack UAV can utilize RTK-GPS technology to control a group counter-attack UAVs flying or operating in a coordinated manner or formation.

In another example regarding the position of a particular group of counter-attack UAVs relative to each other, each counter-attack UAV can have UWB tags as accurate position sensors as a replacement or back-up for positioning purposes when GPS is unavailable. UWB ranging works by measuring the time of flight (TOF) of a very short (~9 ps) pulse transmitted between two UWB tags. Generally regarding UWB tags, using a precise clock, a node 1 sends a packet to node 2, and node 2 measures the precise Time of Arrival (TOA) of the packet. It then returns a packet that includes the total time from TOA of the request packet to transmission of the return packet. Node 1 can then determine the TOF of the two packets and determine an accurate distance between the two Nodes. Ranges in free space can be as far as 410 m with accuracy of greater than 10 cm. A typical ground-based three-dimensional measurement system consists of 3 to 4 anchor tags with well-known positions. There can then be multiple target tags within that space whose position in three-dimensions can be accurately measured. UWB tags can be used to determine accurate positions within a UAV cooperative constellation (i.e., counter-attack UAVs cooperative constellation). This uses peer-to-peer ranging between each of the UWB tags to determine an accurate distance between counter-attack UAVs. This is similar to an anchored tag configuration except that the UWB tags on the counter-attack UAVs are the equivalent of the anchor tags with unknown positions. The information provided by the peer-to-peer ranging by itself is not complete enough to solve an exact (x, y, and z) coordinate position of each counter-attack UAV.

Figure 5:
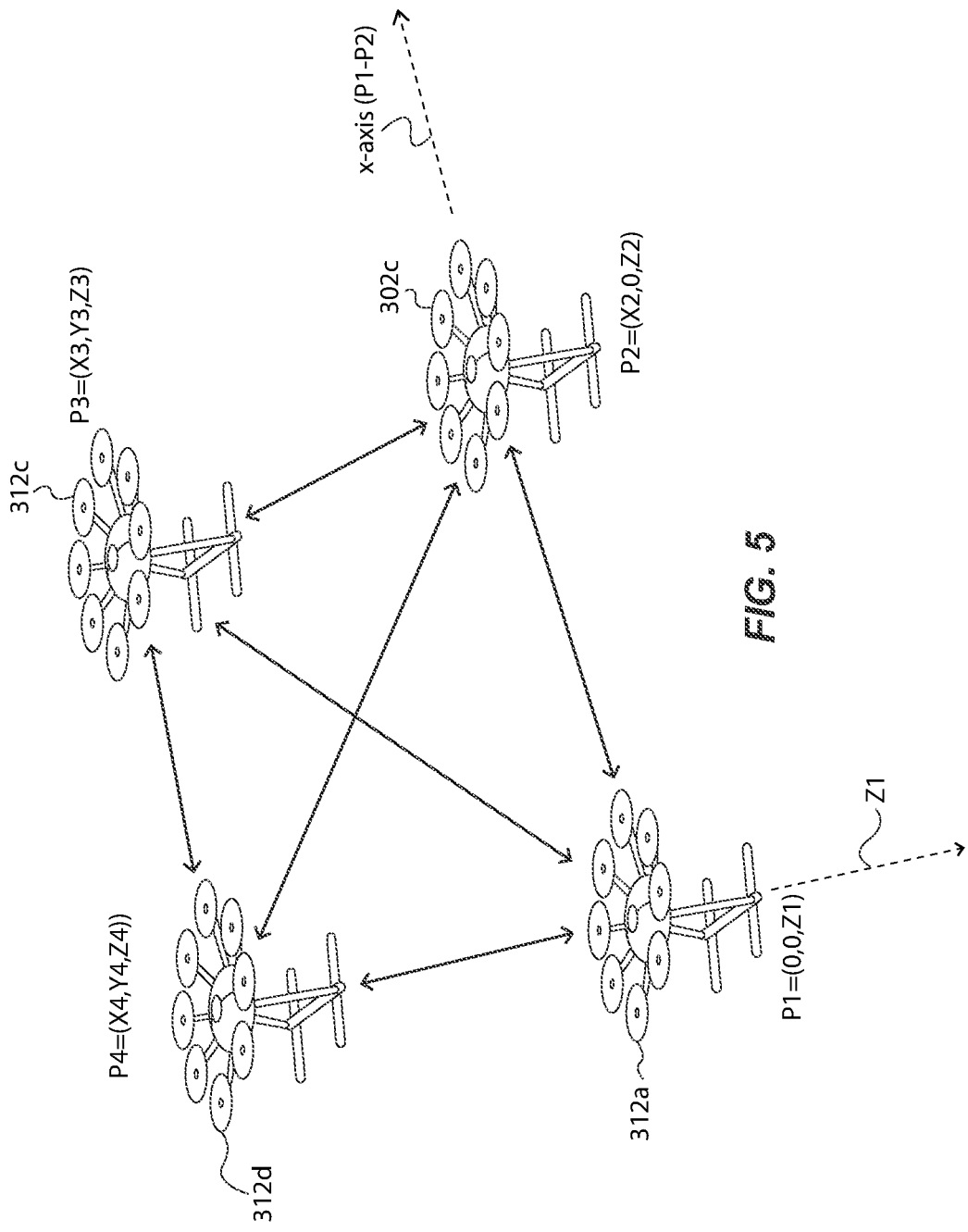
FIG. 5 illustrates a plurality of counter-attack UAVs available for coordinated flight based on a method of calculation for control of the plurality of counter-attack UAVs in a swarm or other coordinated configuration, and that can support an aerial vehicle capture countermeasure.

Therefore, in one example as illustrated in FIG. 5, where four counter-attack UAVs are used, a relative positioning solution can be calculated if one of the three coordinates is known (e.g. altitude (z) and a position (P1) arbitrarily designated as the origin node of a first counter-attack UAV 312a). Using an altimeter on each counter-attack UAV 312a-d, the z-coordinate is determined, then defining the x-coordinate line from P1 to P2 (position of a second counter-attack UAV 312b) as the x-axis, there are then five equations that relate distance P2 to P3, P3 to P4, P1 to P4, P2 to P3 and P1 to P3 with five unknown variables to solve for (x2, x3, y3, x4, y4). Several numerical methods, such as the well-known Newton method, have been developed to solve non-linear sets of equations of this type. Alternatively GPS coordinates could be used as starting coordinates and the UWB distances used to correct for the GPS error. UWB tags could also be used for peer-to-peer communications.

FIGS. 6A and 6B illustrate a system and method for neutralizing a target aerial vehicle (e.g., 104a), and that comprises a plurality of counter-attack UAVs (e.g., see counter-attack UAVs 402a and 402b) supporting an aerial vehicle capture countermeasure 434. The counter-attack UAVs 402a and 402b can have the same or similar features of the counter-attack UAVs discussed regarding FIGS. 1-5. In this example, counter-attack UAVs 402a and 402b operate in a coordinated manner to move the aerial vehicle capture countermeasure 434 (e.g., a net 435) from a stowed position (FIG. 6A) to a deployed position (FIG. 6B).

The system can comprise first and second net storage devices 401a and 401b associated with a structure (e.g., 137 of FIG. 1) that can each be configured to store at least some of the net 435 when in the stowed position. A first tether 403a can couple the counter-attack UAV 402a to one side of the net 435, and a second tether 403b can couple the counter-attack UAV 402b to the other side of the net 435. The first and second net storage devices 401a and 401b can be hollow tubes or other hollow support members that store at least some of the net 435, and that allow traverse of respective tethers 403a and 403b through the hollow tubes in a suitable manner (note that the net storage devices 401a and 401b and the tethers 403a and 403b are shown somewhat schematically to illustrated that the tethers are moved through openings of the storage devices).

The first and second net storage devices 401a and 401b can also act as a support platform or pedestal for respective counter-attack UAVs 402a and 402b when in a grounded position to conserve battery power when not being operated or flown. In response to detection of a target aerial vehicle (as discussed above), the counter-attack UAVs 402a and 402b can be autonomously deployed and operated to fly (e.g., generally vertically), thereby drawing the net 435 from the first and second net storage devices 401a and 401b to the deployed or expanded position of FIG. 6B. In some examples, the tethers 403a and 403b can be relatively long (e.g., up to 100 m, or more) so that the net 435 can be strategically positioned at relatively high altitudes, depending on the tracked position of the target aerial vehicle. The width of the net 435 can be relatively long as well, such as up to 100 m or more.

In one example, first and second drum reels 405a and 405b (shown schematically) can support the other ends of respective tethers 403a and 403b in a manner that the tethers 403a and 403b are wound around respective drum reels 405a and 405b (alternatively, one centralized drum reel can be used to wrap/unwrap both tethers 403a and 403b). The drum reels 405a and 405b can be operable to allow the respective tethers 403a and 403b to unwind or spool out therefrom when the counter-attack UAVs 402a and 402b are operated to pull upwardly the net 435 upon deployment (e.g., the tethers can be unwound passively with some mechanical resistance device or spring, or can be wound actively via electric motors and a controller). Thus, the drum reels 405a and 405b can then be operated to retract the respective tethers 403a and 403b, thereby pulling downwardly the net 435 and the counter-attack UAVs 402a and 402b, to adjust the height of the net 435, or to return the net 435 to its stowed position, if desired or programmed to do such. In this manner, the drum reels 405a and 405b can be electrically powered and controlled to wind or unwind the respective tethers 403a and 403b. The drum reels 405a and 405b can have a controller that is communicatively coupled to the external aerial vehicle detection system 100 to receive control commands to unwind or wind the respective tethers 403a and 403b based on the detected position (e.g., altitude, flight path, etc.) of a detected target aerial vehicle. In another aspect, the drum reels 405a and 405b can be communicatively coupled (wired or wirelessly) to one or more of the counter-attack UAVs 402a and 402b, so that the counter-attack UAVs 402a and 402b can command or control the winding or unwinding of the tethers 403a and 403b.

Once the net 435 is moved to the deployed position by the counter-attack UAVs 402a and 402b, the counter-attack UAVs 402a and 402b can be operated to move the net 435 in various directions (but limited by the net 435 being tethered to the ground or structure). For instance, the counter-attack UAVs 402a and 402b can fly vertically higher, or generally forward or backward toward the ground surface to somewhat "trap" the target aerial vehicle that may be within a sufficient distance to capture or trap (see e.g., FIG. 7), thereby reducing the amount of airspace the target aerial vehicle has to evade the net 435.

In one example, the tethers 403a and 403b can comprise, or support, respective power lines that electrically couple the counter-attack UAVs 402a and 402b to at least one external power source 407 (e.g., a battery, DC power, etc.), as shown in FIG. 6B. Advantageously, the external power source 407 can power the counter-attack UAVs 402a and 402b for extended or indefinite flight times (e.g., days, months, years). This can allow the counter-attack UAVs 402a and 402b to continuously maintain a deployed position of the net 435 to protect a particular area indefinitely. This may be advantageous over target aerial vehicles that are untethered from a power source and in flight because their battery power sources are limited. Therefore, such "externally powered" counter-attack UAVs 402a and 402b may be operable to maintain the position of a particular net beyond the duration it would take for target aerial vehicles to exhaust any onboard power.

Figure 9:
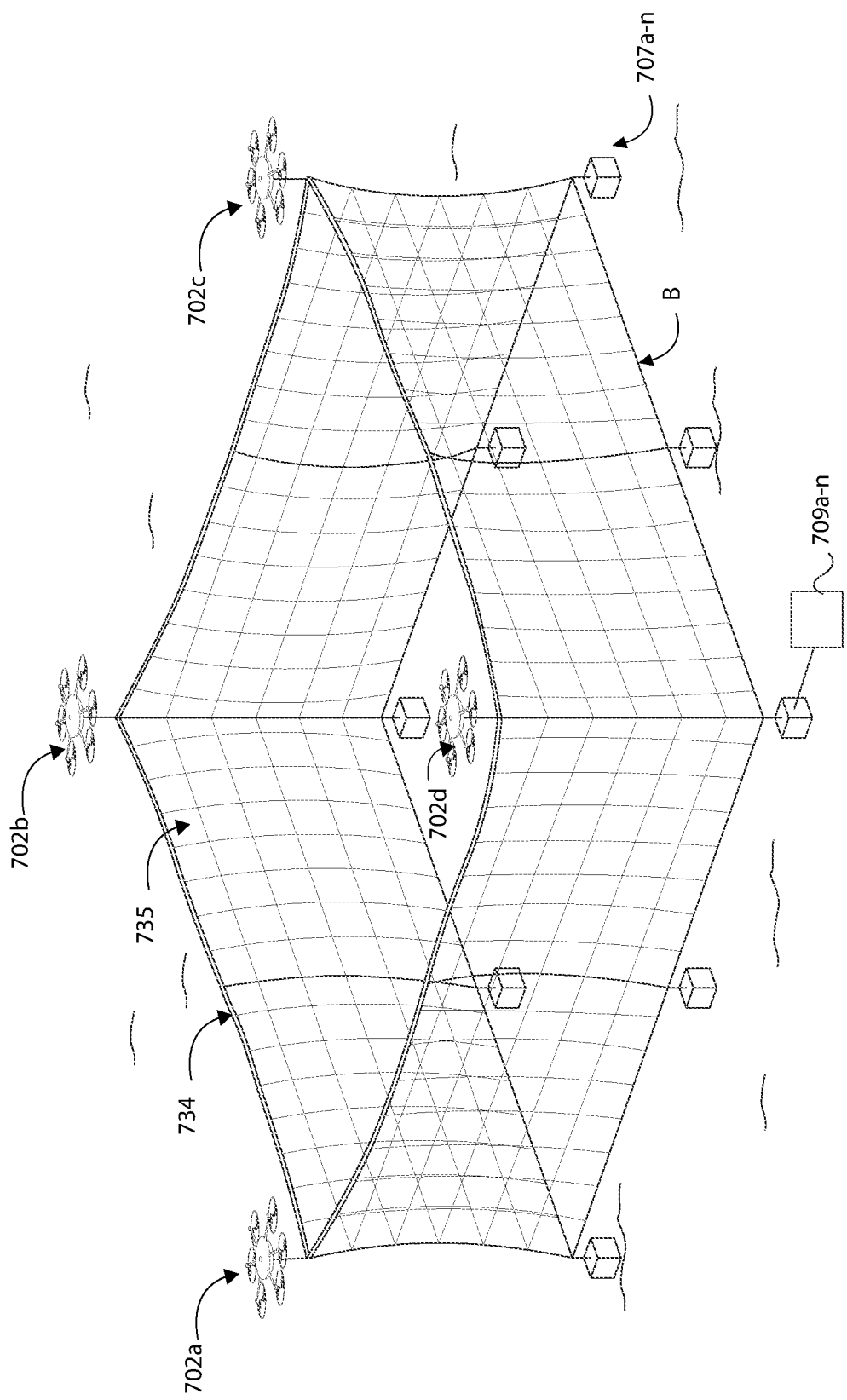
FIG. 9 illustrates a system for neutralizing a target aerial vehicle and comprising a plurality of counter-attack UAVs supporting an aerial vehicle capture countermeasure in a deployed position in accordance with an example of the present disclosure.

The illustrations of FIGS. 6A and 6B are not meant to be limiting, as numerous counter-attack UAVs can be coupled to the net in any number of manners and arrangements, such as in a three-dimensional arrangement (e.g., see FIG. 9). The net 435 may also comprise some low-drag tendrils that extend many meters from various portions of the net 435, and that may comprise free ends, such as those capable of fluttering in the wind to be readily entangled in rotors of target aerial vehicles. This can generate a somewhat three-dimensional capture zone proximate the counter-attack UAVs, which is difficult or impossible for target aerial vehicles (and their human operators) to detect, particularly in examples where the tendrils are very thin, clear monofilament tendrils.

The net 435 (and other nets or filament elements discussed herein) can be manufactured as a number of different high-strength filaments. For instance, high-strength ultra-high molecular weight polyethylene (UHMWPE) fibers, such as Dyneema® produced by DSM, or Spectra® produced by Honeywell (i.e., monofilaments) can be utilized, which use long molecular chains to transfer loads within individual fibers. Other types will be apparent to those skilled in the art. Various pound test and mesh sizes can be used, depending on the application, such as, but not being limited to, 1.5-pound test and 2.25 square inch mesh may be suitable to capture any number of available UAVs, for instance. Some nets may have knots where they intersect, and others may be knotless netting that utilizes four-strand braiding techniques that eliminate knots. The elimination of knots reduces drag and improves handling during deployment and stowage of a particular net, such as the net 435 and others discussed herein.

Figure 7:
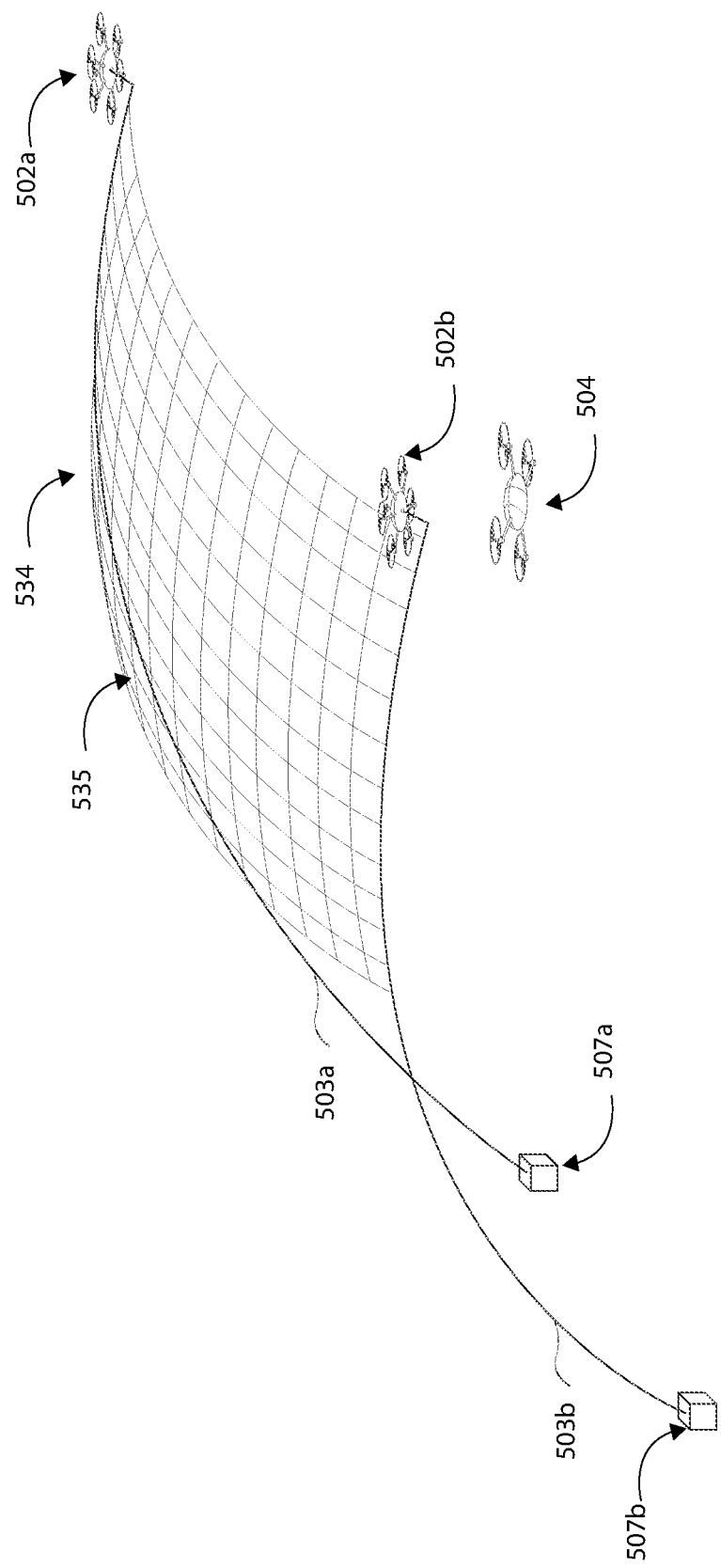
FIG. 7 illustrates a system for neutralizing a target aerial vehicle with a plurality of counter-attack UAVs supporting an aerial vehicle capture countermeasure in a deployed position in accordance with an example of the present disclosure.

FIG. 7 illustrates a system and method for neutralizing a target aerial vehicle 504 comprising a plurality of counter-attack UAVs 502a and 502b supporting an aerial vehicle capture countermeasure 534. The counter-attack UAVs 502a and 502b can have the same or similar features of the counter-attack UAVs discussed regarding FIGS. 1-6B. In this example, counter-attack UAVs 502a and 502b can be operable in a coordinated manner to move the aerial vehicle capture countermeasure 534 (e.g., a net 535) to a trap position or trap orientation (e.g., from a vertical orientation, such as in FIG. 6B).

In this manner, a first tether 503a can couple the counter-attack UAV 502a to one side of the net 535, and a second tether 503b can couple the counter-attack UAV 502b to the other side of the net 535. The tethers 503a and 503b can be coupled at respective ends to respective structures 507a and 507b (or to a single structure), which can be ground-based structures. Once the counter-attack UAVs 502a and 502b have moved the net 535 to a generally vertical orientation (e.g., like in FIG. 6B), the counter-attack UAVs 502a and 502b can be operated to fly forward and in a downward arc flight path to trap the target aerial vehicle 504. This tends to reduce the volume of airspace through which the target aerial vehicle 504 can fly to evade the net 535. This system presents a two-dimensional net capture system, where the first dimension is provided when the net 535 is positioned generally vertically, and the second dimension is provided when the counter-attack UAVs 502a and 502b are operated to fly forward/downward to move the net 535 into another (second) dimension to trap the target aerial vehicle 504. In some examples, the structures 507a and 507b can include or support drum reel(s) and/or power source(s), such as discussed above regarding FIGS. 6A-6B.

FIGS. 8A and 8B illustrate a system and method for neutralizing a target aerial vehicle (e.g., 104a), and comprising a plurality of counter-attack UAVs 602a-d supporting an aerial vehicle capture countermeasure 634. The counter-attack UAVs 602a-d can have the same or similar features of the counter-attack UAVs discussed regarding FIGS. 1-6B. In this example, the counter-attack UAVs 602a-d are operable in a coordinated manner to deploy and move the aerial vehicle capture countermeasure 634 (e.g., a net 635) to capture a target aerial vehicle.

More specifically, a first tether 603a couples the counter-attack UAV 602a to one side of the net 635, and a second tether 603b couples the counter-attack UAV 602d to the other side of the net 635. The other counter-attack UAVs 602b and 602c can be coupled along a top area or portion of the net 635, and the counter-attack UAVs 602a-d can be spatially separated along the top area of the net 635.

At the other end, the tethers 603a and 603b can be coupled to respective movable net support mechanisms 607a and 607b. The movable support mechanisms 607a and 607b can be movable ground vehicles or other devices operable to move along a rail system or track 609 as shown (or along a ground surface, whether restrained or unrestrained to the ground). The track 609 can be supported by a ground surface or other structure, such as about the ground around an airport, or even on top of a building, vessel, stadium, etc. The track 609 can extend around some or all of a particular perimeter area to be protected.

As shown in FIG. 8A, the counter-attack UAVs 602a-d can be in a grounded position while the net 635 is in a stowed or grounded position (e.g., bundled or wrapped, etc.). In response to detection of a target aerial vehicle, the counter-attack UAVs 602a-d can be operated to move the net 635 from the stowed position to a deployed position, as shown in FIG. 8B. The counter-attack UAVs 602a-d can fly autonomously on their own in response to one or more of the counter-attack UAVs 602a-d detecting the target aerial vehicle, or the counter-attack UAVs 602a-d can be instructed or commanded to fly, and where to fly, via command data transmitted from an external aerial vehicle detection system (e.g., system 100 discussed regarding FIG. 1). Alternatively, one or both of the movable support mechanisms 607a and 607b can support at least one detection sensor (e.g., 106a discussed above), so that the movable net support mechanism(s) 607a and 607b can detect a target aerial vehicle, and then communicate command data to one or more of the counter-attack UAVs 602a-d, so that the counter-attack UAVs 602a-d can deploy the net 635 at an appropriate time and location.

Once the counter-attack UAVs 602a-d have moved the net 635 to a generally vertical orientation when deployed (e.g., FIG. 8B), the movable support mechanisms 607a and 607b can be operated in a coordinated manner to move the net 635 from one lateral position along the track 609 to another position along the track 609 (or moved continuously) to better position the net 635 to capture the target aerial vehicle, depending upon the tracked flight path of the target aerial vehicle. At the same time, the counter-attack UAVs 602a-d can be operated to fly in the same lateral direction along with the movement of the movable support mechanisms 607a and 607b (however, the counter-attack UAVs 602a-d may merely be pulled or moved by virtue of the force of moving the movable support mechanisms 607a and 607b).

The movable support mechanisms 607a and 607b can have a wireless (or wired) communication device communicatively coupled to one or more of the counter-attack UAVs 602a-d to facilitate collective movement of the counter-attack UAVs 602a-d and the movable support mechanisms 607a and 607b relative to the track 609. This presents a two-dimensional net capture system, where the first dimension is provided when the net 635 is positioned generally vertically, and the second dimension is provided when the movable support mechanisms 607a and 607b are operated to move the net 635 laterally into another (second) dimension along the track 609. Similarly as described above regarding FIG. 7, the counter-attack UAVs 602a-d can be operated to fly forward or rearward relative to the track 609 (in or out of the page of FIG. 8B) to move the net 635 into a trap position or orientation. This provides another (third) dimension of movement of the net 635.

Therefore, in response to detection of a target aerial vehicle flying in a relatively low elevation (e.g., 100 m or less, and approximately 1 km away from the position of the stowed net 635 and the grounded counter-attack UAVs 602a-d (FIG. 8A)), the counter-attack UAVs 602a-d can quickly deploy the net 635 (within a few seconds or less), and then the movable support mechanisms 607a and 607b and the counter-attack UAVs 602a-d can travel along the track toward the detected position or flight path of the target aerial vehicle at relatively high speeds (e.g., up to 40 m/s or more). The movable support mechanisms 607a and 607b and the counter-attack UAVs 602a-d can then be operated to stop or slow to a particular location or position along an estimated flight path of the target aerial vehicle determined to be accurate to capture the target aerial vehicle in the net 635.

In some examples, the movable support mechanisms 607a and 607b can include or support drum reel(s) and/or power source(s), such as discussed regarding FIGS. 6A-6B. In this manner, the counter-attack UAVs 602a-d can fly for an extended period of time in cases where back-up batteries are supported by the movable support mechanisms 607a and 607b and electrically coupled to the counter-attack UAVs 602a-d. In another example, the counter-attack UAVs 602a-d can operate indefinitely in cases where the track 609 is used as a conduit to supply power to the movable support mechanisms 607a and 607b and to counter-attack UAVs 602a-d, for example.

The dynamic net support mechanism 607a and 607b can instead be a single dynamic net support mechanism or vehicle coupled to a lower end of the net, and even having an additional horizontal support structure coupled along the lower end of the net to properly orient the net. The dynamic net support mechanism 607a and 607b can be electrically powered carts or vehicles, or they can be mechanically moved by a cable or cord associated with the track 609 that pulls the net support mechanisms 607a and 607b in either direction along the track. As will be apparent to those skilled in the art, still other mechanisms and systems capable of tethering and moving and positioning the net along a ground or ground-based structure (e.g., a building) are contemplated herein, and as such, the examples shown in the drawings and described herein are not meant to be limiting in any way.

FIG. 9 illustrates a system and method for neutralizing a target aerial vehicle (e.g., 104a), and comprising a plurality of counter-attack UAVs 702a-d supporting an aerial vehicle capture countermeasure 734. The counter-attack UAVs 702a-d can have the same or similar features of the counter-attack UAVs discussed regarding FIGS. 1-8B. In this example, counter-attack UAVs 702a-d are operable in a coordinated manner to maintain or support the aerial vehicle capture countermeasure 734 (e.g., a net 735) in a deployed position to define a perimeter net area B (e.g., a rectangular perimeter to protect an area or assets therein). More specifically, a plurality of tethers (e.g., similar to tether 703a shown) can couple the counter-attack UAVs 702a-d to respective structures (e.g., see representative structure 707a, to which tether 703a is coupled). The plurality of tethers (e.g., tether 703a can be coupled at respective ends to respective structures (e.g., 707a) (or to a single structure). The counter-attack UAVs 702a-d can move the net 735 between stowed and deployed positions (only the deployed position is shown here). Any number of counter-attack UAVs can support the net 735, such that the net 735 can surround a relatively large area, such as an area that is 500 m×500 m, or more in some cases. Once a target aerial vehicle is detected as coming toward an area protected by the counter-attack UAVs 702a-d, the counter-attack UAVs 702a-d can be operated to vertically fly in a coordinated manner to deploy the net 735 to protect the area from all lateral directions around the net 735. This can be achieved in just a few seconds from detecting a target aerial vehicle.

In some examples, the structure 707a can include or support drum reel(s) and/or power source(s) 709a, such as discussed above regarding FIGS. 6A-6B. Advantageously, in cases where the counter-attack UAVs 702a-d are electrically powered by an external power source, the perimeter net area B can be maintained for an extended period of time (e.g., days, weeks, months), and even indefinitely. In some examples, the system of FIG. 9 can be employed on a vessel to protect a wheel house, for instance, or on top of a building or other structure to protect vital assets thereon.

In other cases, the system of FIG. 9 can entirely replace or replicate a security fence system that may be required around a protected area. In this manner, sensors (e.g., motion, torque, etc.) can be coupled around various portions of the net 735 to detect the presence/impact of unwanted adversarial people or assets, such as ground vehicles, aircraft, personnel, etc. that may contact the net 735. Additionally, the counter-attack UAVs 702a-d can provide video surveillance via their on-board cameras, and thereby can transmit video feed to a remote location.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for neutralization of a target aerial vehicle, comprising:
   a plurality of counter-attack unmanned aerial vehicles (UAVs);
   an aerial vehicle detection system comprising at least one detection sensor operable to detect a target aerial vehicle in flight;
   a net tethering the plurality of counter-attack UAVs to each other; and
   a net storage device corresponding to each of the plurality of counter-attack UAVs, each net storage device configured to store at least a portion of the net when in a stowed position, and to facilitate deployment of the net when moved to a deployed position via coordinated flight of the plurality of counter-attack UAVs based on the detected target aerial vehicle.

2. The system of claim 1, wherein the aerial vehicle detection system further comprises at least one on-board sensor supported by at least one counter-attack UAV, the at least one on-board sensor configured to detect a position of the target aerial vehicle, and wherein the counter-attack UAVs are operable to autonomously move the net to the deployed position based on the detected position of the target aerial vehicle.

3. The system of claim 2, wherein the at least one on-board sensor comprises a camera movably coupled to the flight body and operable to modify a pointing position of the camera according to the detected position of the target aerial vehicle.

4. The system of claim 1, wherein the aerial vehicle detection system comprises an external aerial vehicle detection system associated with a ground-based structure to monitor an airspace, wherein the at least one detection sensor comprises a plurality of detection sensors operable to detect a plurality of target aerial vehicles.

5. The system of claim 1, wherein each counter-attack UAV comprises a communication device communicatively coupled to other communication devices of the other counter-attack UAVs to communicate respective positions of the plurality of counter-attack UAVs, thereby facilitating coordinated flight of the plurality of counter-attack UAVs.

6. The system of claim 1, wherein each counter-attack UAV is electrically coupled to an external power source for powering the counter-attack UAV.

7. The system of claim 1, further comprising a drum reel device corresponding to each net storage device, each drum reel device coupled to the net by a retractable tether and operable to facilitate deployment of the net via the retractable tether when moved to the deployed position.

8. The system of claim 1, wherein the counter-attack UAVs are operable in a coordinated manner to move the net, after being moved to the deployed position, to a capture position based on the position of the detected target aerial vehicle.

9. The system of claim 1, wherein the each of the one or more counter-attack UAVs comprises a flight body and a flight control system supported about the flight body, the flight control system operable to facilitate flight of the counter-attack UAVs.

10. The system of claim 9, wherein the flight control system comprises a flight controller operable to control autonomous flight of the counter-attack UAV based on the detected position of the target aerial vehicle.

11. The system of claim 1, further comprising a plurality of counter-attack UAVs tethered to the net and operable in a coordinated manner to support the net in the deployed position to define a perimeter net area.

12. The system of claim 1, wherein the aerial vehicle detection system provides command data associated with the detected target aerial vehicle to the plurality of counter-attack UAVs, and wherein the plurality of counter-attack UAVs operate based on the command data received.

13. The system of claim 1, wherein the at least one of the net storage devices is associated with at least one of ground or a structure.

14. The system of claim 1, wherein each net storage device is configured as a support platform for the corresponding counter-attack unmanned aerial vehicle.

15. The system of claim 1, wherein the net comprises one or more tendrils extending therefrom.

16. The system of claim 1, wherein each net storage device is supported about and operable with a movable net support mechanism.

17. A method for neutralization of a target aerial vehicle, comprising:
tethering a plurality of counter-attack unmanned aerial vehicles (UAVs) to each other with a net;
operating respective net storage devices associated with each of the plurality of counter-attack UAVs, each net storage device configured to store at least a portion of the net when in a stowed position;
detecting, via an aerial vehicle detection system, a target aerial vehicle in flight;
operating the plurality of counter-attack UAVs to deploy the net, and to maintain the net in a deployed position; and
capturing the target aerial vehicle with the net.

18. The method of claim 17, wherein detecting the target aerial vehicle further comprises tracking a dynamic flight position with an aerial vehicle detection system.

19. The method of claim 17, further comprising communicating position data to the plurality of counter-attack UAVs to facilitate coordinated flight.

20. The method of claim 17, further comprising coordinating flight of the plurality of counter-attack UAVs to deploy the net from a stowed position to a deployed position.

21. The method of claim 17, wherein detecting the target aerial vehicle comprises autonomously detecting the target aerial vehicle and autonomously tracking the target aerial vehicle.

22. The method of claim 17, further comprising transmitting command data, associated with the detected target aerial vehicle, from an aerial vehicle detection system to the plurality of counter-attack UAVs.

23. The method of claim 17, further comprising powering the plurality of counter-attack UAVs with an external power source for extended flight time.

24. The method of claim 17, wherein detecting the target aerial vehicle further comprises operating a plurality of detection sensors to generate position data associated with the target aerial vehicle, the method further comprising continuously communicating the position data to the plurality of counter-attack UAVs.

25. The method of claim 17, further comprising coupling the plurality of counter-attack UAVs to an external power source for at least periodically powering the counter-attack UAVs.

26. The method of claim 17, wherein detecting the target aerial vehicle further comprises operating a plurality of detection sensors to generate position data associated with the target aerial vehicle, the method further comprising eliminating position data associated with one or more detection sensors based on a credibility hierarchy associated with the plurality of detection sensors.

27. The method of claim 17, wherein operating the net storage devices comprises operating a drum reel device associated with at least one of ground or a structure and coupled to the net by a retractable tether, the drum reel device facilitating deployment of the net via the retractable tether when moved to the deployed position.

28. The method of claim 17, further comprising communicatively coupling a plurality of communication devices of the plurality of counter-attack UAVs to one another to communicate respective positions of the plurality of counter-attack UAVs, thereby facilitating coordinated flight of the plurality of counter-attack UAVs.

* * * * *